(12) United States Patent
Park et al.

(10) Patent No.: US 11,909,900 B2
(45) Date of Patent: *Feb. 20, 2024

(54) PORTABLE COMMUNICATION DEVICE INCLUDING SEALING MEMBER

(71) Applicant: Samsung Electronics Co., Ltd., Suwon-si (KR)

(72) Inventors: Jungwon Park, Suwon-si (KR); Youngmin Kang, Suwon-si (KR); Sunghun Kim, Suwon-si (KR); Yunsik Kim, Suwon-si (KR); Jingook Kim, Suwon-si (KR); Chijoon Kim, Suwon-si (KR); Hyosung La, Suwon-si (KR); Suman Lee, Suwon-si (KR); Seungjoon Lee, Suwon-si (KR); Seungwhee Choi, Suwon-si (KR); Junyoung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,179

(22) Filed: Feb. 13, 2023

(65) Prior Publication Data

US 2023/0195180 A1 Jun. 22, 2023

Related U.S. Application Data

(63) Continuation of application No. 17/150,109, filed on Jan. 15, 2021, now Pat. No. 11,592,877, which is a (Continued)

(30) Foreign Application Priority Data

May 31, 2019 (KR) .................. 10-2019-0064725
Jul. 19, 2019 (KR) .................. 10-2019-0087766

(Continued)

(51) Int. Cl.
*H04M 1/02* (2006.01)
*G06F 1/16* (2006.01)

(52) U.S. Cl.
CPC ........ *H04M 1/0268* (2013.01); *G06F 1/1616* (2013.01); *G06F 1/1641* (2013.01);
(Continued)

(58) Field of Classification Search
CPC .... G06F 1/1681; G06F 1/1652; G06F 1/1641; G06F 1/1616; H04M 1/0218; H04M 1/0268

See application file for complete search history.

(56) References Cited

U.S. PATENT DOCUMENTS 6,382,448 B1 * 5/2002 Yuhara ................. H05K 5/0017
220/62.22
8,938,856 B1 * 1/2015 Shin ..................... G06F 1/1681
16/365

(Continued)

FOREIGN PATENT DOCUMENTS

CN 101689067 A 3/2010
CN 103221895 A 7/2013

(Continued)

OTHER PUBLICATIONS

International Search Report and written opinion dated Jun. 26, 2020, issued in International Patent Application No. PCT/KR2020/003606.

(Continued)

*Primary Examiner* — Nidhi Thaker
(74) *Attorney, Agent, or Firm* — Jefferson IP Law, LLP

(57) ABSTRACT

A portable communication device or electronic device is provided. The communication device includes a housing including a first housing structure, a second housing structure, and a hinge cover positioned between at least a portion (Continued)

of the first housing structure and at least a portion of the second housing structure, a flexible display at least partially received in the housing and including a first portion corresponding to the first housing structure, a second portion corresponding to the second housing structure, and a third portion corresponding to the hinge cover, a hinge structure positioned between the third portion of the flexible display and the hinge cover and connected with the first housing structure and the second housing structure, and at least one sealing member positioned between the third portion of the flexible display and the hinge cover and contacting the hinge cover.

11 Claims, 20 Drawing Sheets

Related U.S. Application Data continuation of application No. 16/846,864, filed on Apr. 13, 2020, now Pat. No. 10,928,860.

(30) Foreign Application Priority Data

Sep. 3, 2019 (KR) .................. 10-2019-0108733
Jan. 9, 2020 (KR) .................. 10-2020-0002991

(52) U.S. Cl.
CPC .......... *G06F 1/1652* (2013.01); *G06F 1/1681* (2013.01); *H04M 1/0218* (2013.01); *G06F 2203/04102* (2013.01); *H04M 1/0269* (2022.02)

(56) References Cited

U.S. PATENT DOCUMENTS

| | | | |
|---|---|---|---|
| 8,971,031 B2* | 3/2015 | Mok | G06F 1/1656 361/679.27 |
| 9,173,288 B1* | 10/2015 | Kim | G06F 1/1681 |
| 9,348,362 B2* | 5/2016 | Ko | G06F 1/1601 |
| 9,348,450 B1* | 5/2016 | Kim | H04M 1/0268 |
| 9,348,540 B2 | 5/2016 | Kim | |
| 9,535,452 B2 | 1/2017 | Ahn | |
| 9,557,771 B2 | 1/2017 | Park et al. | |
| 9,798,359 B2 | 10/2017 | Seo et al. | |
| 10,013,027 B2 | 7/2018 | Sun | |
| 10,028,395 B2 | 7/2018 | Chen et al. | |
| 10,365,691 B2 | 7/2019 | Bae et al. | |
| 11,073,863 B2* | 7/2021 | Kim | H04M 1/0216 |
| 2002/0104769 A1* | 8/2002 | Kim | G06F 1/1681 206/320 |
| 2004/0264118 A1* | 12/2004 | Karidis | G06F 1/1647 361/679.55 |
| 2010/0246103 A1* | 9/2010 | Visser | H04M 1/0268 361/679.01 |
| 2011/0063783 A1* | 3/2011 | Shim | H04M 1/022 361/679.01 |
| 2012/0099264 A1 | 4/2012 | Degner et al. | |
| 2013/0021762 A1* | 1/2013 | van Dijk | H04M 1/022 361/749 |
| 2013/0270980 A1 | 10/2013 | Hsu | |
| 2014/0333542 A1 | 11/2014 | Barreca | |
| 2015/0230570 A1 | 8/2015 | Kim | |
| 2015/0366089 A1* | 12/2015 | Park | G06F 1/1641 361/679.01 |
| 2016/0147263 A1* | 5/2016 | Choi | G06F 1/1652 361/679.3 |
| 2017/0142847 A1 | 5/2017 | Park | |
| 2017/0374749 A1 | 12/2017 | Lee et al. | |
| 2018/0109871 A1 | 4/2018 | Huh et al. | |
| 2019/0033920 A1 | 1/2019 | Yun et al. | |

FOREIGN PATENT DOCUMENTS

| | | |
|---|---|---|
| CN | 106205385 A | 12/2016 |
| CN | 107067976 A | 8/2017 |
| CN | 107547700 A | 1/2018 |
| CN | 208316809 U | 1/2019 |
| EP | 2 156 265 A1 | 2/2010 |
| EP | 2 696 257 A2 | 2/2014 |
| EP | 2 801 887 A1 | 11/2014 |
| WO | 2008/133508 A1 | 6/2008 |

OTHER PUBLICATIONS

Extended European Search Report dated Jan. 21, 2021, issued in European Application No. 20166398.6.
Indian Office Action dated Apr. 18, 2022, issued in Indian Patent Application No. 202115055861.
Chinese Office Action dated Jun. 17, 2021, issued in Chinese Patent Application No. 202010406581.4.
Chinese Decision on Rejection dated Sep. 29, 2022, issued in Chines Application No. 202010406581.4.
Indian Office Action dated Nov. 18, 2022, issued in Indian Application No. 202215042795.
Chinese Notice of Patent Grant with English translation dated Jul. 21, 2023; Chinese Appln. No. 202010406581.4.

* cited by examiner

PORTABLE COMMUNICATION DEVICE INCLUDING SEALING MEMBER

CROSS-REFERENCE TO RELATED APPLICATION(S)

This application is a continuation application of prior application Ser. No. 17/150,109 filed on Jan. 15, 2021, which has issued as U.S. Pat. No. 11,592,877 on Feb. 28, 2023; which is a continuation application of prior application Ser. No. 16/846,864 filed on Apr. 13, 2020, which has issued as U.S. Pat. No. 10,928,860 on Feb. 23, 2021; and which is based on and claimed priority under 35 U.S.C. § 119 of a Korean patent application number 10-2019-0064725, filed on May 31, 2019, in the Korean Intellectual Property Office, and of a Korean patent application number 10-2019-0087766, filed on Jul. 19, 2019, in the Korean Intellectual Property Office, and of a Korean patent application number 10-2019-0108733, filed on Sep. 3, 2019, in the Korean Intellectual Property Office, and of a Korean patent application number 10-2020-0002991, filed on Jan. 9, 2020, in the Korean Intellectual Property Office, the disclosure of each of which is incorporated by reference herein in its entirety.

BACKGROUND

1. Field

The disclosure relates to portable communication devices or electronic devices. More particularly, the disclosure relates to a portable communication devices or electronic devices with sealing members.

2. Description of Related Art

Developing electronic information communication technology integrates various functionalities into a single electronic device or portable communication device. For example, smartphones pack the functionalities of a sound player, imaging device, and scheduler, as well as the communication functionality and, on top of that, may implement more various functions by having applications installed thereon.

The user of a portable communication device or electronic device may search, screen, and obtain more information by accessing a network, but rather than simply using the own functionalities or information (e.g., applications) of the electronic device. Direct access to the network (e.g., wired communication) may enable quick and stable communication establishment but its usability may be limited to a fixed location or space. In accessing a network, wireless communication is free from locational or spatial limitations and its transmission speed or stability approaches that of direct access. In the near future, wireless communication is expected to establish communication more rapidly and stably than direct access.

As smartphones or other personal/portable communication devices spread, user demand for portability and use convenience is on the rise. For example, a touchscreen display may not only serve as an output device of visual information but also provide a virtual keyboard that replaces a mechanical input device (e.g., a button input device). As such, portable communication devices or electronic devices may be made compact while delivering further enhanced applicability (e.g., a larger screen). Flexible displays, e.g., foldable or rollable displays, will become commercially available and electronic devices are expected to deliver better portability and use convenience.

If a display or electronic device is foldable or rollable, it would be easier to carry while providing a larger screen. To protect its internal electronic components or battery from external impacts, the outer structure (e.g., housing) of the electronic device may be rigid. For an electronic device to roll in/fold and roll out/unfold, its outer structures may be coupled together to be movable or rotatable about each other.

While moving or rotating with each other, the rigid outer structures may rub against each other, causing noise or damage. An approach to address such issue is to leave a gap between the respective rubbing portions of the two outer structures. However, the gap may allow a foreign body to come in. Such foreign body may damage or contaminate the electronic components of the electronic device. For example, the unwanted material may be stuck between mechanical or electronic parts which move with respect to each other, deforming or cracking the parts.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a portable communication device or electronic device including a sealing member between the outer structures.

Additional aspects will be set forth in part in the description which follows and, in part, will be apparent from the description, or may be learned by practice of the presented embodiments.

In accordance with an aspect of the disclosure, a portable communication device or electronic device is included. A portable communication device or electronic device includes a sealing member for preventing deformation or cracks in the internal components.

In accordance with an aspect of the disclosure, a portable communication device or electronic device is included. The portable communication device or the electronic device includes a housing including a first housing structure, a second housing structure, and a hinge cover positioned between at least a portion of the first housing structure and at least a portion of the second housing structure, a flexible display at least partially received in the housing and including a first portion corresponding to the first housing structure, a second portion corresponding to the second housing structure, and a third portion corresponding to the hinge cover, a hinge structure positioned between the third portion of the flexible display and the hinge cover and connected with the first housing structure and the second housing structure, and at least one sealing member positioned between the third portion of the flexible display and the hinge cover and contacting the hinge cover.

In accordance with an aspect of the disclosure, a portable communication device or electronic device is included. The portable communication device or the electronic device includes a first housing structure, a second housing structure rotatable between a first position in which the second housing structure is folded to face the first housing structure, and a second position in which the second housing structure is unfolded in parallel with a side of the first housing structure, a hinge structure rotatably coupling the first housing structure and the second housing structure, a hinge cover disposed between the first housing structure and the second housing structure to cover the hinge structure, a display including a first portion disposed in the first housing structure, a second portion disposed in the second housing structure, and a folding portion provided between the first portion and the second portion and disposed corresponding to the hinge cover, and at least one sealing member mounted on the hinge cover to prevent accumulation of foreign bodies between the hinge cover and the display, the sealing member tightly contacting an edge of the display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
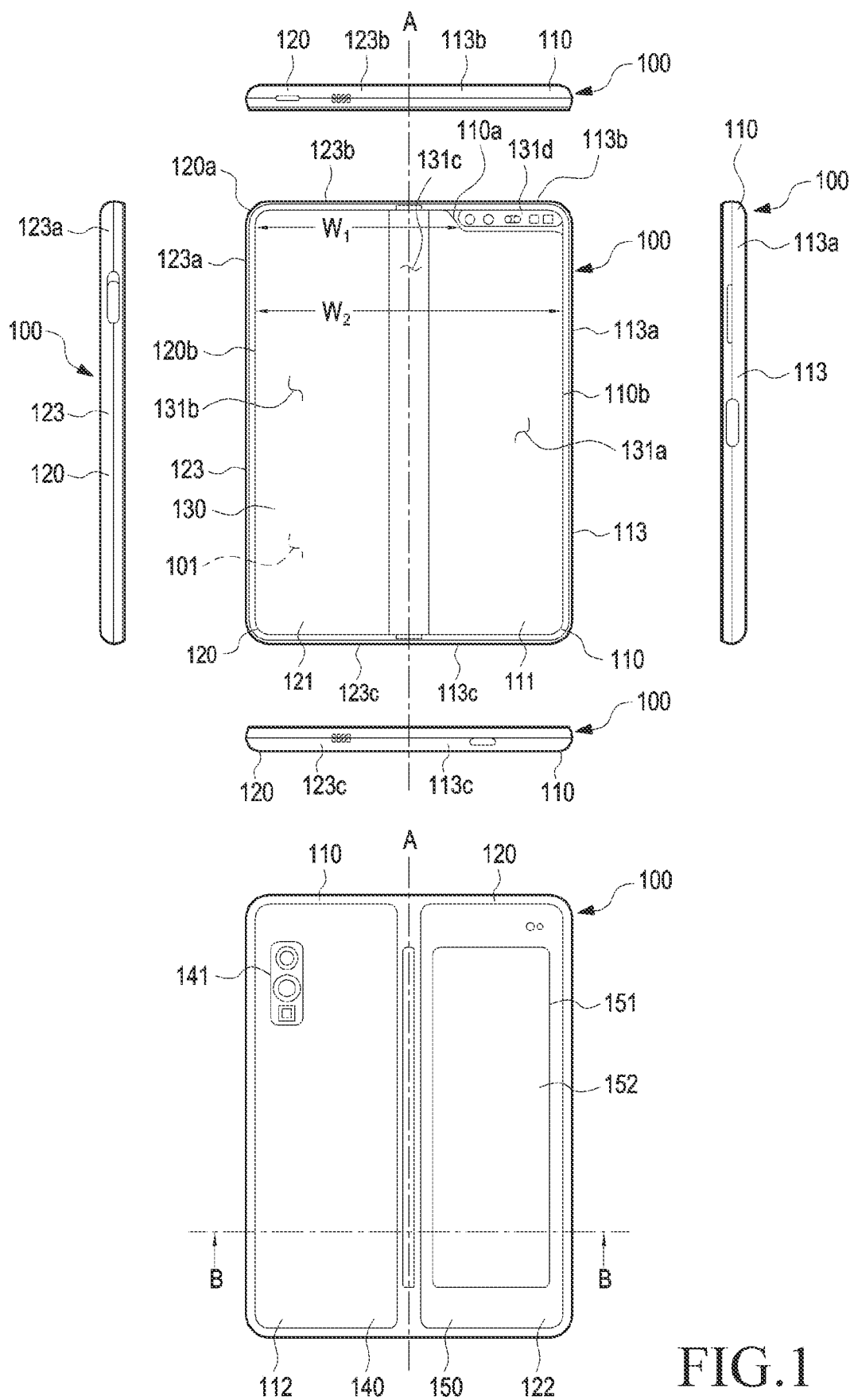
FIG. 1 is a view illustrating an unfolded state of a portable communication device or electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a view illustrating an unfolded state of a portable communication device or electronic device 100 according to an embodiment of the disclosure.

Figure 2:
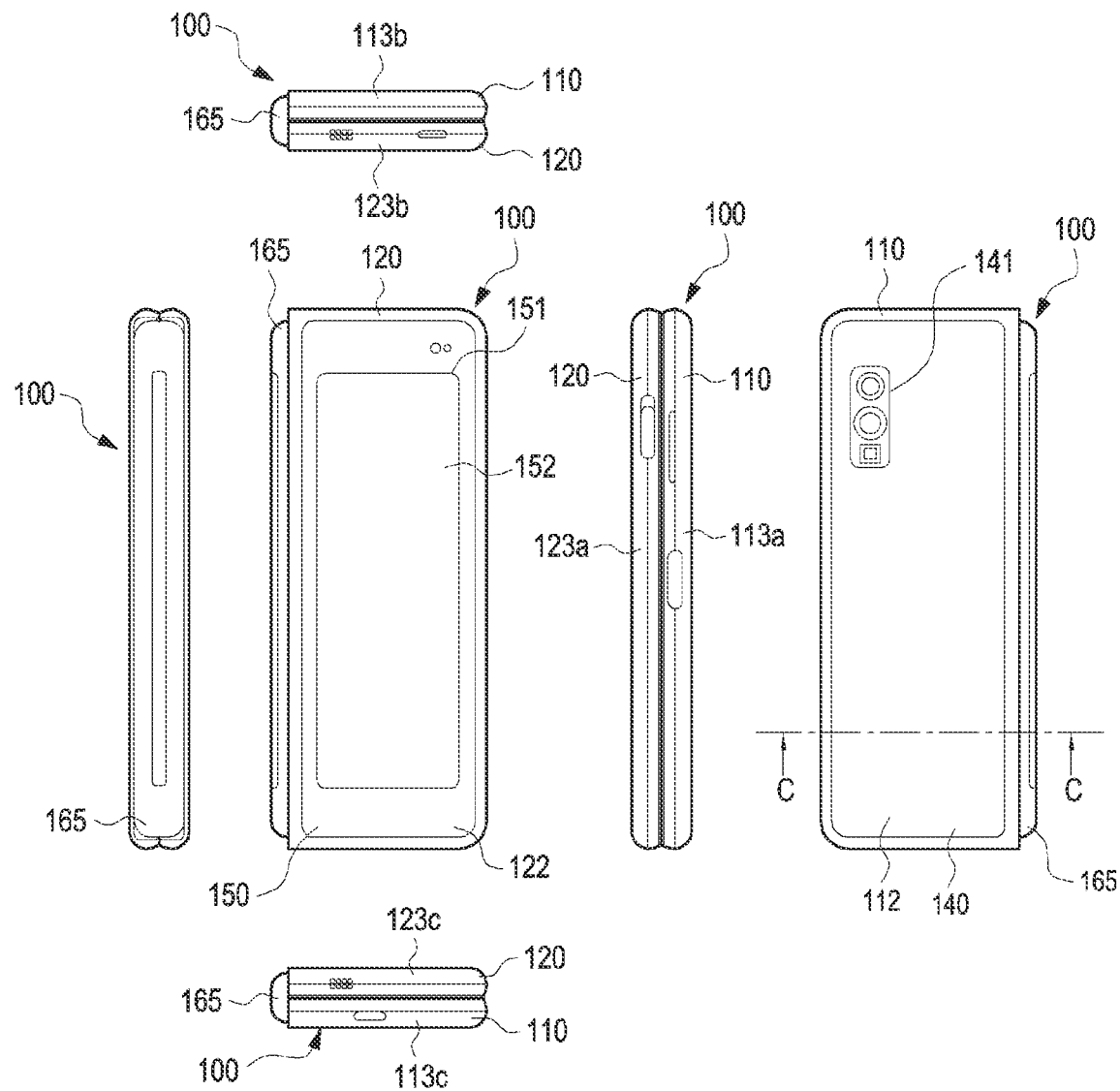
FIG. 2 is a view illustrating a folded state of the electronic device of FIG. 1, according to an embodiment of the disclosure.

FIG. 2 is a view illustrating a folded state of the electronic device 100 of FIG. 1, according to an embodiment of the disclosure.

In the following description, a pair of housing structures are rotatably coupled together via a hinge structure, for example. However, it should be noted that the portable communication device or electronic device according to various embodiments of the disclosure is not limited thereto. For example, according to various embodiments, the portable communication device or electronic device may include three or more housing structures. As used herein, a "pair of housing structures" may mean two rotatably-coupled housing structures among three or more housing structures.

Referring to FIG. 1, an electronic device 100 may include a pair of housing structures 110 and 120 coupled together via a hinge structure (e.g., the hinge structure 164a of FIG. 3) to be rotatable to fold to each other, a hinge cover 165 covering foldable portions of the pair of housing structures 110 and 120, and a display 130 (e.g., a flexible display or foldable display) disposed or received in a space formed by the pair of housing structures 110 and 120. The hinge cover 165 may be positioned between at least a portion of the first housing structure 110 and at least a portion of the second housing structure 120. The hinge structure 164a may be disposed between the display 130 and the hinge cover 165 and be connected to the first housing structure 110 and the second housing structure 120. According to an embodiment, the electronic device 100 may include a foldable housing rotatably coupled from the position in which the pair of housing structures 110 and 120 are folded together to the position in which the pair of housing structures 110 and 120 are unfolded flat. In the disclosure, when the pair of housing structures 110 and 120 are unfolded side-by-side, the surface where the display 130 is in may be defined as a 'front surface' of the electronic device 100, and its opposite surface may be defined as a 'back surface' of the electronic device 100. The surface surrounding the space between the front and back surfaces may be defined as a 'side surface' of the electronic device 100.

According to an embodiment, the pair of housing structures 110 and 120 may include a first housing structure 110, a second housing structure 120, a first back cover 140, and a second back cover 150. The pair of housing structures 110 and 120 of the electronic device 100 are not limited to the shape and coupling shown in FIGS. 1 and 2 but may rather be implemented in other shapes or via a combination and/or coupling of other components. For example, the first housing structure 110 and the first back cover 140 may be integrally formed with each other, and the second housing structure 120 and the second back cover 150 may be integrally formed with each other. According to an embodiment, the first housing structure 110 may include the first back cover 140, and the second housing structure 120 may include the second back cover 150.

According to an embodiment, the first housing structure 110 and the second housing structure 120 may be positioned on opposite sides of a first axis, e.g., a folding axis A, and they may be overall symmetrical in shape with each other with respect to the folding axis A. According to an embodiment, the first housing structure 110 and the second housing structure 120 may be rotated on the hinge structure 164a or hinge cover 165 with respect to different folding axes. For example, the first housing structure 110 and the second housing structure 120 each may be rotatably coupled to be rotatable on the hinge structure 164a or hinge cover 165. According to an embodiment, as the first housing structure 110 and the second housing structure 120 each are rotated around the folding axis A or different folding axes, they may rotate with respect to each other from the position where two different areas of the front surface face each other to the position where the two different areas of the front surface are inclined or unfolded side-by-side.

As used herein, when A and B are positioned or extend side-by-side, it may mean that A and B are positioned at least partially next to each other or at least partially in parallel with each other. According to an embodiment, when A and B are disposed (or arranged) side-by-side, it may mean that A and B are disposed (or arranged) to face in the same direction or directions parallel with each other. According to an embodiment, even when A and B are inclined with each other in an angle range from about 160 degrees to about 180 degrees, A and B may be said to be disposed (or arranged) side-by-side. In the following description, although the example phrases "side-by-side" and "in parallel with each other" may be used to describe the corresponding structures, the shape or arrangement of the structures may easily be appreciated from the accompanying drawings.

According to an embodiment, the first housing structure 110 and the second housing structure 120 may form different angles or distances depending on whether they are in an unfolded state (or, extended state, flat state, or open state) or folded state (or folding state), or in a state therebetween. According to an embodiment, the first housing structure 110 and the second housing structure 120 may be symmetrical in shape except that the first housing structure 110 further includes a sensor area 131d where various sensors are arranged. Alternatively, the sensor area 131d may be disposed in the second housing structure 120, not the first housing structure 110, or another sensor area may be included in the second housing structure 120.

According to an embodiment, in the unfolded state of the electronic device 100, the first housing structure 110 may be connected to the hinge structure (e.g., the hinge structure 164a of FIG. 3) and may include a first surface 111 disposed to face the front surface of the electronic device 100, a second surface 112 facing away from the first surface 111, and a first side surface member 113 surrounding at least a portion of the space between the first surface 111 and the second surface 112. According to an embodiment, the first side surface member 113 may include a first side surface 113a disposed in parallel with the folding axis A, a second side surface 113b extending from one end of the first side surface 113a in a direction perpendicular to the folding axis A, and a third side surface 113c extending from the other end of the first side surface 113a in a direction perpendicular to the folding axis A. As used herein, the term "perpendicular" or "parallel" may be interchangeably used with "partially perpendicular" or "partially parallel." In some embodiments, "parallel" or "perpendicular" may also mean "inclined in an angle range within about 10 degrees."

According to an embodiment, the second housing structure 120 may be connected to the hinge structure (e.g., the hinge structure 164a of FIG. 3) and, in the unfolded state of the electronic device 100, the second housing structure 120 may include a third surface 121 disposed to face the front surface of the electronic device 100, a fourth surface 122 facing away from the third surface 121, and a second side surface member 123 surrounding at least a portion of the space between the third surface 121 and the fourth surface 122. According to an embodiment, the second side surface member 123 may include a fourth side surface 123a disposed in parallel with the folding axis A, a fifth side surface 123b extending from one end of the fourth side surface 123a in a direction perpendicular to the folding axis A, and a sixth side surface 123c extending from the other end of the fourth side surface 123a in a direction perpendicular to the folding axis A. According to an embodiment, the third surface 121, in the folded state, may be disposed to face the first surface 111. According to an embodiment, the second side surface member 123 may be formed in substantially the same shape or material as the first side surface member 113 although they may partially differ in their specific shapes.

According to an embodiment, the electronic device 100 may include a recess 101 to receive the display 130 via a structural shape combination of the first housing structure 110 and the second housing structure 120. The recess 101 may have substantially the same size as the display 130. According to an embodiment, due to the sensor area 131d, the recess 101 may have two or more different widths W1 and W2 in the direction perpendicular to the folding axis A. For example, the recess 101 may have a first width W1 between a first portion 120a, parallel with the folding axis A, of the second housing structure 120, and a first portion 110a, formed at an edge of the sensor area 131d, of the first housing structure 110 and a second width W2 formed by a second portion 120b of the second housing structure 120 and a second portion 110b, which is parallel with the folding axis A and does not correspond to the sensor area 131d, of the first housing structure 110. In this case, the second width W2 may be larger than the first width W1. For example, the recess 101 may be formed with the first width W1 between the first portion 110a of the first housing structure 110 and the first portion 120a of the second housing structure 120, which are asymmetrical in shape with each other, and the second width W1 between the second portion 110b of the first housing structure 110 and the second portion 120b of the second housing structure 120, which are symmetrical in shape with each other. According to an embodiment, the first portion 110a and second portion 110b of the first housing structure 110 may be formed to have different distances from the folding axis A. The width of the recess 101 is not limited thereto. According to an embodiment, the recess 101 may have two or more different widths depending on the shape of the sensor area 131d or the asymmetrical shape portions of the first housing structure 110 and the second housing structure 120.

According to an embodiment, the first housing structure 110 and the second housing structure 120 may at least partially be formed of a metal or non-metallic material with a rigidity selected to support the display 130. According to an embodiment, the first housing structure 110 and the second housing structure 120 may at least partially include an electrically conductive material. When the first housing structure 110 and the second housing structure 120 include an electrically conductive material, the electronic device 100 may transmit/receive radio waves via the electrically conductive portions of the first housing structure 110 and the second housing structure 120. For example, the processor or communication module of the electronic device may perform wireless communication using a portion of the first housing structure 110 and the second housing structure 120.

According to an embodiment, the sensor area 131d may be formed adjacent to one corner of the first housing structure 110 and to have a predetermined area. However, the placement, shape, or size of the sensor area 131d is not limited to that shown in the drawings. For example, according to an embodiment, the sensor area 131d may be provided in a different corner of the first housing structure 110 or in any area between the top corner and the bottom corner. According to an embodiment, the sensor area 131d may be disposed in at least an area of the second housing structure 120. According to an embodiment, the sensor area 131d may be disposed to extend to the first housing structure 110 and the second housing structure 120. According to an embodiment, the electronic device 100 may include components exposed from its front surface through the sensor area 131d or one or more openings prepared in the sensor area 131d and may perform various functions by way of the components. The components arranged in the sensor area 131d may include at least one of, e.g., a front camera device, a proximity sensor, an illuminance sensor, an iris recognition sensor, an ultrasonic sensor, or an indicator.

According to an embodiment, the first back cover 140 may be disposed on the second surface 112 of the first housing structure 110 and may have a substantially rectangular periphery. According to an embodiment, the periphery of the first back cover 140 may be at least partially surrounded by the first housing structure 110. Similarly, the second back cover 150 may be disposed on the fourth surface 122 of the second housing structure 120 and its periphery may be at least partially surrounded by the second housing structure 120.

In the shown embodiment, the first back cover 140 and the second back cover 150 may be substantially symmetrical in shape with respect to the folding axis A. According to an embodiment, the first back cover 140 and the second back cover 150 may have other various different shapes. According to an embodiment, the first back cover 140 may be integrally formed with the first housing structure 110, and the second back cover 150 may be integrally formed with the second housing structure 120.

According to an embodiment, a combined structure of the first back cover 140, the second back cover 150, the first housing structure 110, and the second housing structure 120 may provide a space where various components (e.g., a printed circuit board, antenna module, sensor module, or battery) of the electronic device 100 may be arranged. According to an embodiment, one or more components may be arranged or visually exposed on/through the back surface of the electronic device 100. For example, one or more components or sensors may be visually exposed through a first back surface area 141 of the first back cover 140. According to an embodiment, the sensor may include a proximity sensor, a rear camera device, and/or flash. According to an embodiment, a sub display 152 may be at least visually exposed through a second back surface area 151 of the second back cover 150.

The display 130 may be disposed in a space formed by the pair of housing structures 110 and 120. For example, the display 130 may be seated in a recess (e.g., the recess 101 of FIG. 1) formed by the pair of housing structures 110 and 120, and the display 130 may be disposed to occupy substantially most of the front surface of the electronic device 100. For example, the front surface of the electronic device 100 may include the display 130, a partial area (e.g., an edge area) of the first housing structure 110, which is adjacent to the display 130, and a partial area (e.g., an edge area) of the second housing structure 120. According to an embodiment, the back surface of the electronic device 100 may include the first back cover 140, a partial area (e.g., an edge area) of the first housing structure 110, which is adjacent to the first back cover 140, the second back cover 150, and a partial area (e.g., an edge area) of the second housing structure 120, which is adjacent to the second back cover 150.

According to an embodiment, the display 130 may mean a display at least a portion of which may be transformed to be flat or curved. According to an embodiment, the display 130 may include a folding portion 131c, a first portion 131a disposed on one side of the folding portion 131c (e.g., a right-hand area of the folding portion 131c), and a second portion 131b disposed on the opposite side of the folding portion 131c (e.g., a left-hand area of the folding portion 131c). For example, the first portion 131a may be disposed on the first surface 111 of the first housing structure 110, and the second portion 131b may be disposed on the third surface 121 of the second housing structure 120. For example, the display 130 may extend from the first surface 111 through the hinge cover 165 or the hinge structure 164a of FIG. 3 to the third surface 121, and its portion (e.g., the folding portion 131c) corresponding to, at least, the hinge cover 165 or hinge structure 164a may be a flexible portion that may transform from flat to curved.

According to an embodiment, the segmentation of the display 130 is merely an example, and the display 130 may be divided into a plurality of (e.g., four or more or two) areas depending on the structure or function of the display 130. As an example, in the embodiment shown in FIG. 1, the folding portion 131c may extend in the vertical axis (e.g., the y axis of FIG. 3) parallel with the folding axis A, and the area of the display 130 may be divided by the folding portion 131c or the folding axis A. In another embodiment, the area of the display 130 may be divided by another folding portion (e.g., a folding portion parallel with the horizontal axis (e.g., the x axis of FIG. 3) or another folding axis (e.g., a folding axis parallel with the x axis of FIG. 3). The above-described area segmentation means that it may be done so physically by the pair of housing structures 110 and 120 and hinge structure (e.g., the hinge cover 165 or the hinge structure 164a of FIG. 3) and, substantially, one display 130 may be disposed in the area or space provided by the pair of housing structures 110 and 120 and hinge structure (e.g., the hinge cover 165 or hinge structure 164a of FIG. 3) to display a single whole screen.

According to an embodiment, the first portion 131a and the second portion 131b may be overall symmetrical in shape with respect to the folding portion 131c. However, unlike the second portion 131b, the first portion 131a may include a notch area (e.g., the notch area 133 of FIG. 3) that provides the sensor area 131d and, in the remaining area, be symmetrical in shape with the second portion 131b. For example, the first portion 131a and the second portion 131b may include symmetrical portions and asymmetrical portions.

Figure 3:
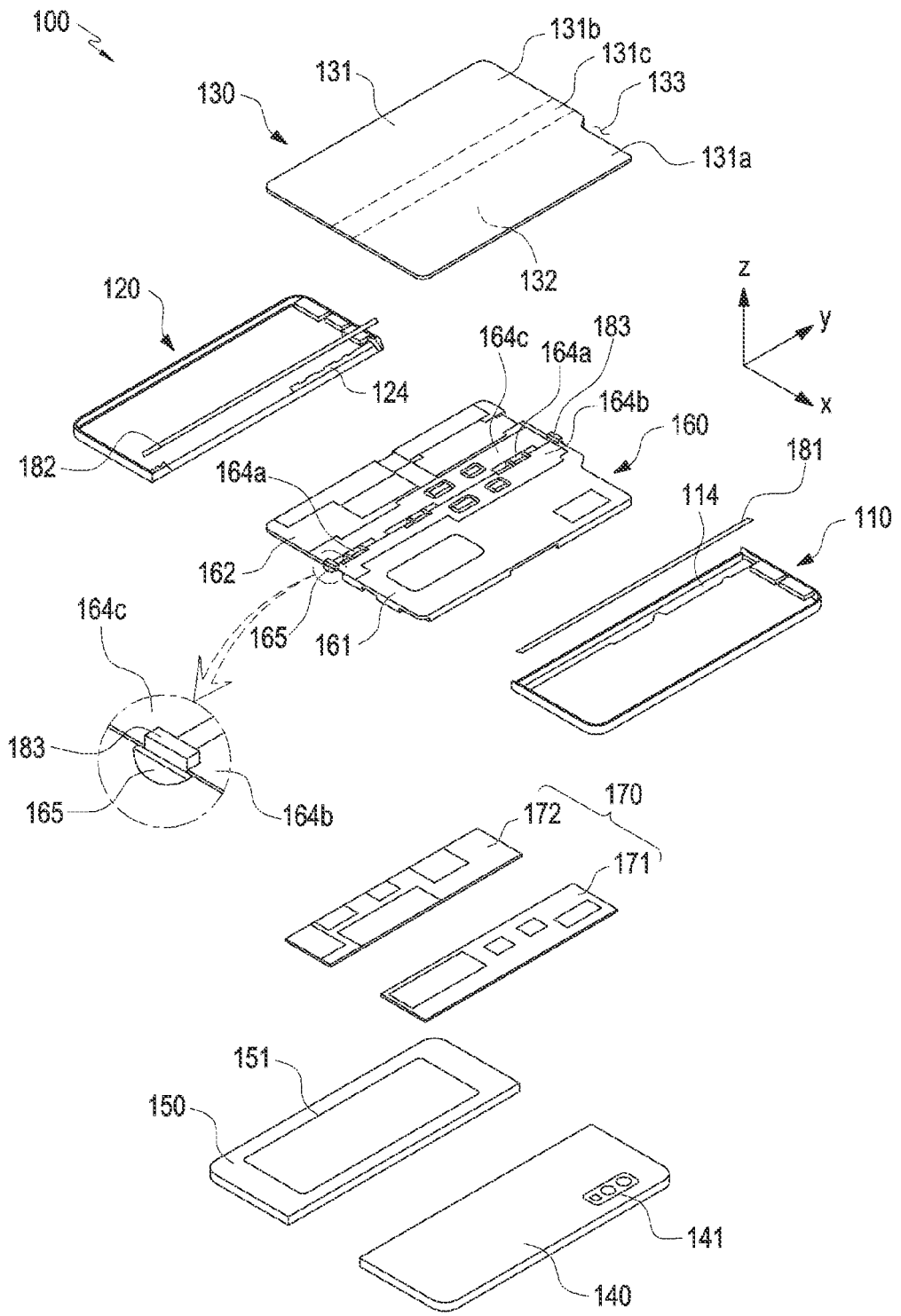
FIG. 3 is an exploded perspective view illustrating a portable communication device or electronic device according to an embodiment of the disclosure.

Referring to FIG. 3, the hinge cover 165 may be disposed between the first housing structure 110 and the second housing structure 120 to hide the internal components (e.g., the hinge structure 164a of FIG. 3). According to an embodiment, the hinge cover 165 may be hidden by a portion of the first housing structure 110 and second housing structure 120 or be exposed to the outside depending on the operation state (e.g., the unfolded state or folded state) of the electronic device 100. For example, the hinge cover 165 may be exposed more in the folded state than in the unfolded state.

Described below are the operation of the first housing structure 110 and the second housing structure 120 and each area of the display 130 depending on the operation state (e.g., the unfolded state and folded state) of the electronic device.

According to an embodiment, when the electronic device 100 is in the unfolded state (e.g., the state as shown in FIG. 1), the first housing structure 110 and the second housing structure 120 are 180-degree angled therebetween, and the first portion 131a and second portion 131b of the display 130 may be placed to display screen in the same direction, e.g., in directions parallel with each other. The folding portion 131c may be flush with the first portion 131a and the second portion 131b.

According to an embodiment, when the electronic device is in the folded state (e.g., the state as shown in FIG. 2), the first housing structure 110 and the second housing structure 120 may face each other. For example, in the folded state (e.g., the state as shown in FIG. 2) of the electronic device 100, the first portion 131a and the second portion 131b of the display 130 may be rendered to face each other, angled at a small angle (e.g., from 0 degrees to 10 degrees) therebetween. In the folded state (e.g., the state as shown in FIG. 2) of the electronic device 100, the folding portion 131c may at least partially form a curved surface with a predetermined curvature.

According to an embodiment, when the electronic device 100 is in an intermediate state, the first housing structure 110 and the second housing structure 120 may be angled therebetween at a predetermined angle, e.g., 90 degrees or 120 degrees. For example, in the intermediate state, the first portion 131a and second portion 131b of the display 130 may be angled therebetween at an angle larger than the angle when it is in the folded state and smaller than the angle when it is in the unfolded state. The folding portion 131c may at least partially have a curved surface with a predetermined curvature and, in this case, the curvature may be smaller than that when it is in the folded state.

FIG. 3 is an exploded perspective view illustrating a portable communication device or electronic device 100 according to an embodiment of the disclosure.

Referring to FIG. 3, according to an embodiment, an electronic device 100 may include a display 130, a supporting member assembly 160, at least one printed circuit board 170, a first housing structure 110, a second housing structure 120, a first back cover 140, and a second back cover 150. In the disclosure, the display 130 may be interchangeably used with a display module or display assembly.

The display 130 may include a display panel 131 (e.g., a flexible display panel) and one or more plates 132 or layers seated on the display panel 131. According to an embodiment, the plate 132 may be disposed between the display panel 131 and the supporting member assembly 160. The display panel 131 may be disposed on at least a portion of one surface (e.g., the Z-axis facing surface of FIG. 3) of the plate 132. The plate 132 may have a shape corresponding to the display panel 131. For example, a portion of the plate 132 may have a shape corresponding to the shape of the notch area 133 of the display panel 131.

The supporting member assembly 160 may include a first supporting member 161, a second supporting member 162, a hinge structure 164a disposed with the first supporting member 161 and the second supporting member 162, a hinge cover 165 covering the hinge structure 164a when the hinge structure 164a is viewed from the outside, and a wiring member (e.g., a flexible printed circuit board (FPCB)) crossing the first supporting member 161 and the second supporting member 162. According to an embodiment, the supporting member assembly 160 may include a first hinge plate 164b mounted on the first supporting member 161 and a second hinge plate 164c mounted on the second supporting member 162. According to an embodiment, the wiring member may be disposed in a direction (e.g., the x-axis direction) crossing the first supporting member 161 and the second supporting member 162 and may be hidden by the first hinge plate 164b or second hinge plate 164c and they are not shown in FIG. 3.

According to an embodiment, the first hinge plate 164b may be mounted inside the first housing structure 110, and the second hinge plate 164c may be mounted inside the second housing structure 120. According to an embodiment, the first hinge plate 164b may be directly mounted on the first supporting member 161, and the second hinge plate 164c may be directly mounted on the second supporting member 162. According to an embodiment, the first hinge plate 164b (or second hinge plate 164c) may be directly mounted in another structure (e.g., a first rotation supporting surface 114 or second rotation supporting surface 124) inside the first housing structure 110 (or the second housing structure 120). For example, the structure in which the first hinge plate 164b (or the second hinge plate 164c) is mounted inside the first housing structure 110 (or the second housing structure 120) may be varied according to embodiments. In another embodiment, the hinge structure 164a may be mounted on the first hinge plate 164b and the second hinge plate 164c, rotatably connecting the second hinge plate 164c to the first hinge plate 164b. For example, a folding axis (e.g., the folding axis A of FIG. 1) may be formed by the hinge structure 164a, and the first housing structure 110 and the second housing structure 120 (or the first supporting member 161 and the second supporting member 162) may be rotated on each other substantially with respect to the folding axis A.

According to an embodiment, the supporting member assembly 160 may be disposed with the plate 132 and at least one printed circuit board 170. As an example, the first supporting member 161 may be disposed with the first portion 131a of the display 130 and a first printed circuit board 171. The second supporting member 162 may be disposed with the second portion 131b of the display 130 and a second printed circuit board 172.

As mentioned above, the at least one printed circuit board 170 may include the first printed circuit board 171 disposed on the first supporting member 161 and the second printed circuit board 172 disposed on the second supporting member 162. The first printed circuit board 171 and the second printed circuit board 172 may be disposed inside a space formed by the second antenna module, the first housing structure 110, the second housing structure 120, the first back cover 140, and the second back cover 150. Components for implementing various functions of the electronic device 100 may be mounted on the first printed circuit board 171 and the second printed circuit board 172.

According to an embodiment, the first housing structure 110 and the second housing structure 120 may be assembled together to be coupled to both sides of the supporting member assembly 160, with the display 130 coupled to the supporting member assembly 160. The first housing structure 110 and the second housing structure 120 may be slidably coupled to two opposite sides of the supporting member assembly 160, e.g., the first supporting member 161 and the second supporting member 162, respectively. The first supporting member 161 and the second supporting member 162 may substantially be received in the first housing structure 110 and the second housing structure 120 and, according to an embodiment, may be interpreted as the respective portions of the first housing structure 110 and the second housing structure 120.

According to an embodiment, the first housing structure 110 may include a first rotation supporting surface 114, and the second housing structure 120 may include a second rotation supporting surface 124 corresponding to the first rotation supporting surface 114. The first rotation supporting surface 114 and the second rotation supporting surface 124 may include a curved surface corresponding to a curved surface included in the hinge cover 165.

According to an embodiment, when the electronic device 100 is in the unfolded state (e.g., the state as shown in FIG. 1), the first rotation supporting surface 114 and the second rotation supporting surface 124 may cover the hinge cover 165, allowing the hinge cover 165 to be not or minimally exposed to the back surface of the electronic device 100. According to an embodiment, when the electronic device 100 is the folded state (e.g., the state as shown in FIG. 2), the first rotation supporting surface 114 and the second rotation supporting surface 124 may rotate along the curved surface of the hinge cover 165, maximally exposing the hinge cover 165 to the back surface of the electronic device 100.

In the above description, the ordinal numbers as in the first housing structure 110, second housing structure 120, first side surface member 113 and the second side surface member 123 have been used merely for distinguishing the components, and it should be noted that the scope of the disclosure is not limited by the use of ordinal numbers. For example, although the sensor area 131d is formed in the first housing structure 110 in the above example, the sensor area 131d may be formed in the second housing structure 120 or in each of the first housing structure 110 and the second housing structure 120. According to an embodiment, although the first back surface area 141 and the sub display 152 are disposed in the first back cover 140 and the second back cover 150, respectively, the first back surface area 141 for placing, e.g., a sensor, and the sub display 152 for outputting the screen, both, may be disposed in either the first back cover 140 or the second back cover 150.

The following description is made with reference to FIGS. 1 to 3 as necessary. In the following embodiments, the components identical to those in the above embodiments or easy to understand from the description of the above embodiments are denoted with or without the same reference numerals and their detailed description may be skipped. In the following description, the state (e.g., the state as shown in FIG. 2) in which the first housing structure 110 and the second housing structure 120 are folded to face each other may be denoted a "first position," and the state (e.g., the state as shown in FIG. 1) in which the first housing structure 110 and the second housing structure 120 are unfolded side-by-side may be denoted a "second position."

According to an embodiment, the electronic device 100 may include sealing members 181 and 182 provided between the hinge cover 165 and the first housing structure 110 and/or between the hinge cover 165 and the second housing structure 120. According to an embodiment, the electronic device 100 may include other sealing members 183 provided between the hinge cover 165 and the display 130. The sealing structure formed between the hinge cover 165 and the first housing structure 110 (or second housing structure 120) is described below with reference to FIGS. 4 to 6. As used herein, 'sealing structure' may mean a structure for blocking off influx of foreign bodies, whether solid or liquid, such as dust or chips. Members or components (e.g., the sealing members 181, 182, and 183 of FIG. 4 described below) forming the 'sealing structure' may be formed of an elastic material that may accumulate elastic force when compressed by external force and, when the external force is released, may go back to its original shape. For example, the components or members forming the 'sealing structure' may prevent influx of, at least, a solid or liquid foreign body into the inside of the electronic device 100.

Figure 4:
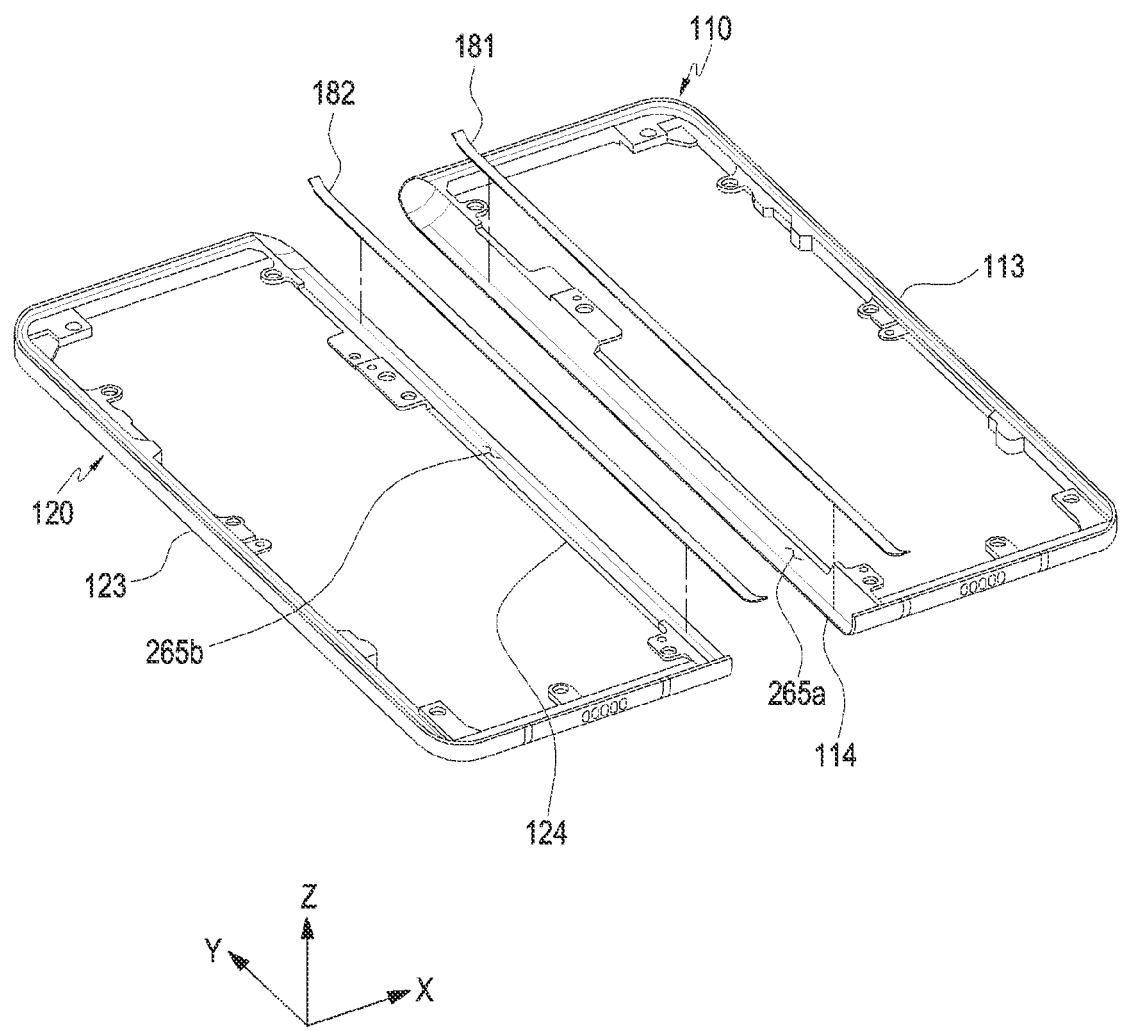
FIG. 4 is an exploded perspective view illustrating a configuration in which a first sealing member or second sealing member is provided in a portable communication device or electronic device according to an embodiment of the disclosure.

FIG. 4 is an exploded perspective view illustrating a configuration in which a first sealing member (e.g., the first sealing member 181 of FIG. 3) or a second sealing member (e.g., the second sealing member 182 of FIG. 3) is mounted in a portable communication device or electronic device (e.g., the electronic device 100 of FIGS. 1 to 3) according to an embodiment of the disclosure.

Figure 5:
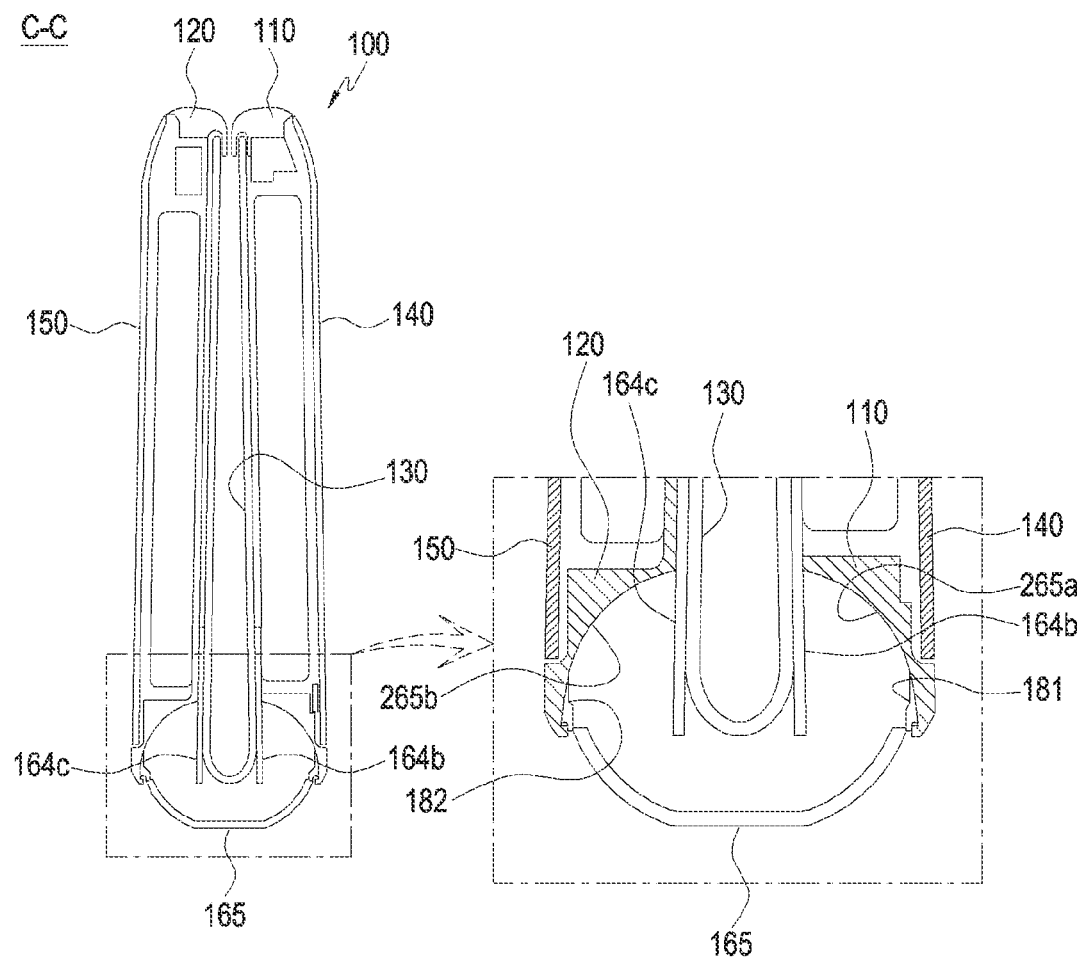
FIG. 5 is a cross-sectional view illustrating a folded position of a portable communication device or electronic device according to an embodiment of the disclosure.

FIG. 5 is a cross-sectional view illustrating a folded position of a portable communication device or electronic device (e.g., the electronic device 100 of FIGS. 1 to 3) according to an embodiment of the disclosure.

Figure 6:
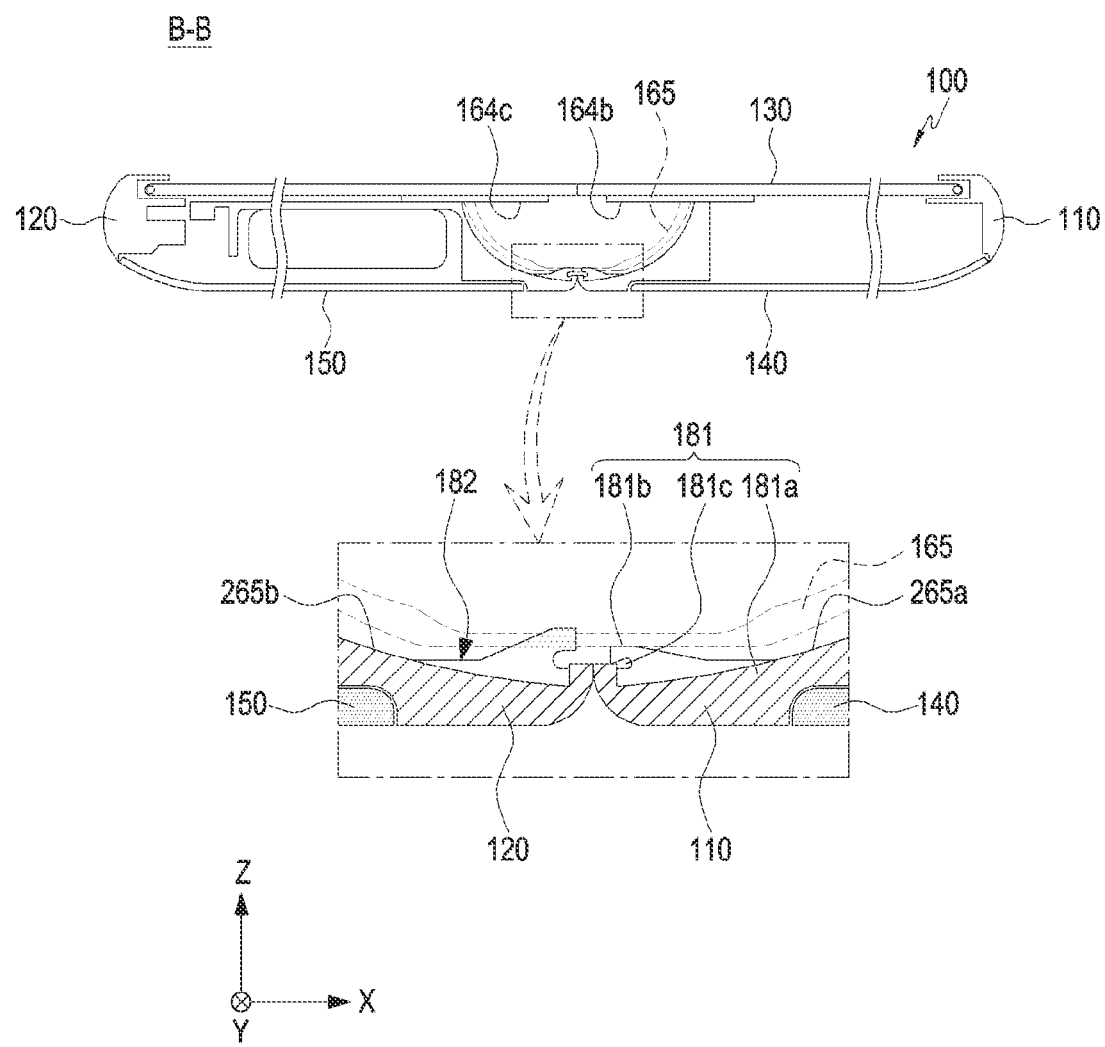
FIG. 6 is a cross-sectional view illustrating an unfolded position of a portable communication device or electronic device according to an embodiment of the disclosure.

FIG. 6 is a cross-sectional view illustrating an unfolded position of a portable communication device or electronic device (e.g., the electronic device 100 of FIGS. 1 to 3) according to an embodiment of the disclosure.

Referring to FIGS. 4 to 6, the first sealing member 181 may include an elastic material, such as rubber, silicone, sponge, polycarbonate, or Teflon™, and the first sealing member 181 may extend in the lengthwise direction (e.g., the y direction of FIG. 3) of the electronic device 100. According to an embodiment, the first sealing member 181 may be provided between a first housing structure (e.g., the first housing structure 110 of FIG. 3) and a hinge cover (e.g., the hinge cover 165 of FIG. 3), forming a sealing structure between the first housing structure 110 and the hinge cover 165.

According to an embodiment, a first rotation supporting surface (e.g., the first rotation supporting surface 114 of FIG. 3) or a second rotation supporting surface (e.g., the second rotation supporting surface 124 of FIG. 3) may include a curved surface 265a or 265b corresponding to the outer circumferential surface of the hinge cover 165. For example, the first rotation supporting surface 114 may be disposed to at least partially surround the outer circumferential surface of the hinge cover 165. When the first housing structure 110 or the second housing structure 120 rotates between the first position and the second position, the first rotation supporting surface 114 may substantially move while at least partially facing the outer circumferential surface of the hinge cover 165, partially hiding or exposing the hinge cover 165. According to an embodiment, the hinge cover 165 may be externally exposed more in the first position than in the second position. When two structures (e.g., the first housing structure 110 and the hinge cover 165) with rigidity directly rub each other in such a relative movement, noise or wear may occur as mentioned above. According to an embodiment, a predetermined gap may be formed between the first rotation supporting surface 114 and the outer circumferential surface of the hinge cover 165, preventing noise or wear due to friction between the rigid structures.

According to an embodiment, the first sealing member 181 may seal off the gap between the first housing structure 110 (e.g., the first rotation supporting surface 114) and the hinge cover 165. For example, the internal space formed by a combination of the first housing structure 110 and the hinge cover 165 may be connected to the external space via the gap between the first housing structure 110 and the hinge cover 165, and the first sealing member 181 may seal off the gap. According to an embodiment, as including the elastic material, the first sealing member 181 may seal off the gap between the first housing structure 110 and the hinge cover 165 while mitigating friction in the rotation of the housing structures 110 and 120 and suppressing noise or wear due to friction.

According to an embodiment, the first sealing member 181 may be mounted or attached to the first rotation supporting surface 114. For example, the first sealing member 181 may be mounted in the first housing structure 110 and be positioned to contact the hinge cover 165. Referring to FIG. 6, the first sealing member 181 may include a fixing portion 181a and a sealing portion 181b. The fixing portion 181a may be mounted in the first housing structure 110 (or the second housing structure 120) and extend in the y direction of FIG. 3, with a predetermined width. According to an embodiment, the sealing portion 181b may extend from the fixing portion 181a and tightly contact the hinge cover 165. Although the first sealing member 181 is mounted or attached to the first rotation supporting surface 114 in the instant embodiment, the disclosure is not limited thereto. For example, the first sealing member 181 may be mounted on the hinge cover 165 in the position or area where it remains hidden by the first housing structure 110. For example, when the first sealing member 181 is mounted on the hinge cover 165, the first sealing member 181 may be positioned to contact the first housing structure 110.

According to an embodiment, in tight contact with the hinge cover 165, the sealing portion 181b may at least partially be deformed to be inclinedly or curved with respect to the fixing portion 181a. For example, the first sealing member 181 may include a recessed portion 181c at least partially surrounded by the fixing portion 181a and the sealing portion 181b. According to an embodiment, the sealing portion 181b may be formed at least partially in an inclined or curved shape with respect to the fixing portion 181a before coming in tight contact with the hinge cover 165. For example, the first sealing member 181 may be made in a shape including the recessed portion 181c.

According to an embodiment, the second sealing member 182 may be mounted in the second housing structure 120 and, although differing in shape or size, the second sealing member 182 may readily be appreciated from the configuration of the first sealing member 181. Thus, no detailed description of the second sealing member 182 is given below.

FIG. 5 is a cross-sectional view of the electronic device 100, taken along line C-C of FIG. 2, with the first housing structure 110 and the second housing structure 120 folded to face each other, for example. Referring to FIG. 5, in the first position, the first sealing member 181 may be positioned adjacent to an edge of the hinge cover 165, and the second sealing member 182 may be positioned adjacent to the opposite edge of the hinge cover 165. FIG. 6 is a cross-sectional view of the electronic device 100, taken along line B-B of FIG. 1, with the first housing structure 110 and the second housing structure 120 unfolded side-by-side, for example. Referring to FIG. 6, in the second position, the first sealing member 181 and the second sealing member 182 may be positioned adjacent to each other.

According to an embodiment, although FIG. 6 illustrates that the sealing portion 181b overlaps the hinge cover 165, this is simply for the purpose of clearer illustration of the shape of the first sealing member 181 or second sealing member 182. For example, in the actual electronic device, the sealing portion 181b may be deformed while tightly contacting the hinge cover 165. According to an embodiment, the sealing portion 181b may deform and accrue elastic force, keeping it in tight contact with the hinge cover 165 in a stable manner According to an embodiment, if the sealing portion 181b accumulates excessive elastic force, an unnecessary load may be applied to the mechanical structure (e.g., the first housing structure 110, second housing structure 120, or hinge cover 165). According to an embodiment, the recessed portion 181c may smooth deformation of the sealing portion 181b, mitigating or preventing excessive accumulation of elastic force or unnecessary overload to the mechanical structure.

According to an embodiment, in the unfolding or folding operation of the electronic device 100, the first sealing member 181 or the second sealing member 182 may slide and contact the outer circumferential surface of the hinge cover 165, allowing the first sealing member 181 and the second sealing member 182 to remain in a stable sealing structure. For example, the first sealing member 181 or the second sealing member 182 may seal off the gap between the first housing structure 110 and the hinge structure 164a or between the second housing structure 120 and the hinge structure 164a. Thus, the internal space formed by a combination of the first housing structure 110, the second housing structure 120, and the hinge cover 165 may be sealed off from the external space by the first sealing member 181 or the second sealing member 182.

According to an embodiment, in configuring an electronic device (e.g., the electronic device 100 of FIGS. 1 to 3) which is foldable or rollable, a plurality of rigid structures (e.g., the first housing structure 110, the second housing structure 120, and/or the hinge cover 165) may be combined to at least partially define an internal space. As the plurality of rigid structures relatively move or rotate with respect to each other, the electronic device 100 may be folded (or rolled up) or unfolded. A predetermined gap secured where the plurality of rigid structures are coupled may prevent friction that may occur in the relative movement or rotation. In various embodiments of the disclosure, a sealing member (e.g., the first sealing member 181 or second sealing member 182) may be placed at a gap left for preventing friction (e.g., the gap between the plurality of rigid structures), preventing influx of an external foreign body into the internal space. The sealing member includes an elastic material, suppressing or mitigating noise or wear due to friction.

Figure 7:
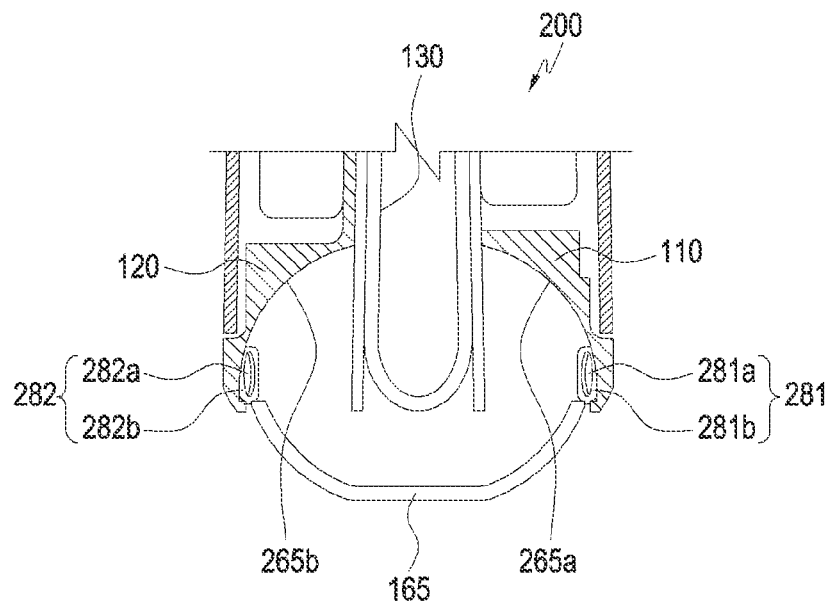
FIGS. 7 and 8 are cross-sectional views illustrating a modified first sealing member or second sealing member in a portable communication device or electronic device according to various embodiments of the disclosure.
Figure 8:
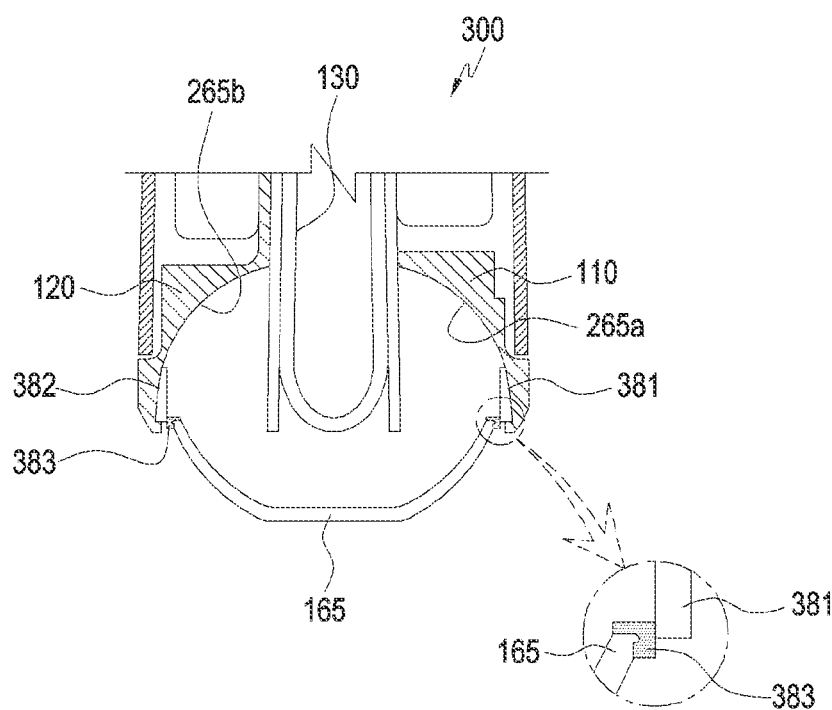

FIGS. 7 and 8 are cross-sectional views illustrating a configuration in which a modified first sealing member (e.g., the first sealing member 181 of FIG. 3 or 5) or a modified second sealing member (e.g., the second sealing member 182 of FIG. 3 or 5) is mounted in a portable communication device or electronic device (e.g., the electronic device 100 of FIG. 1) according to various embodiments of the disclosure.

Referring to FIG. 7, a first sealing member 281 or second sealing member 282 may include a body 281a or 282a formed of sponge. For example, the body 281a or 282a may form a sealing structure between the first housing structure 110 (or the second housing structure 120) and the hinge cover 165. Sponge is a kind of low-density elastic material, providing a sealing structure between the first housing structure 110 and the hinge cover 165 while reducing a load applied to the first housing structure 110 or hinge cover 165 or friction in the folding/unfolding operation of the electronic device 200. According to an embodiment, if the body 281a or 282a which is a low-density elastic material is damaged by an external factor, foreign bodies may occur. According to an embodiment, the first sealing member 281 or the second sealing member 282 may include a sheath layer 281b or 282b surrounding the body 281a or 282a. The sheath layer 281b or 282b may be formed of a fabric material, preventing damage to the body 281a or 282a. According to an embodiment, various frictional coefficients may be set depending on the material of the sheath layer 281b or 282b. For example, the sheath layer 281b or 282b may reduce frictional force between the first sealing member 281 or second sealing member 282 and the hinge cover 165.

Referring to FIG. 8, the hinge cover 165 may further include protrusions 383 at its two opposite edges. The first sealing member 381 and the second sealing member 382 may tightly contact, in their entire width (e.g., the length measured along the x direction of FIG. 3), the hinge cover 165, forming a sealing structure. According to an embodiment, in the first position, e.g., with the electronic device 300 (e.g., the electronic device 100 of FIGS. 1 to 3) folded, the first sealing member 381 or the second sealing member 382 may be positioned partially not in contact with the hinge cover 165. The protrusion(s) 383, in the first position, may interfere with the first sealing member 381 or second sealing member 382, compressing the first sealing member 381 or second sealing member 382. For example, in the first position, the contact area between the first sealing member 381 or second sealing member 382 and the hinge cover 165 may slightly reduce, but more tight contact with the protrusion(s) 383 may be obtained, thus keeping the sealing structure more stable. According to an embodiment, the first sealing member 381 or second sealing member 382 may be formed of a lubricative material, e.g., an acetal resin or Teflon™ sheet, suppressing nose or wear to the hinge cover 165 despite friction with the hinge cover 165.

According to an embodiment, the protrusion 383 may be an extending or projecting portion of the hinge cover 165. For example, the protrusion 383 may have a rigid structure like the hinge cover 165. Alternatively, the protrusion 383 may be formed of a different material, e.g., an elastic material, than the rigid structure of the hinge cover 165. When the protrusion 383 is formed of an elastic material, the protrusion 383 may be formed by insert-molding while simultaneously coupled to the hinge cover 165.

According to an embodiment, as the display (e.g., the display 130 of FIG. 3) is coupled with the rigid structures (e.g., the first housing structure 110, second housing structure 120, and hinge cover 165 of FIG. 3), an internal space of the electronic device (e.g., the electronic device 100 of FIGS. 1 to 3) may be defined. For example, the internal space of the electronic device 100 may substantially mean a space surrounded by the display 130 and the rigid structures.

The folding portion (e.g., the folding portion 131c of FIG. 3) of the display 130 may be deformed to be curved as the electronic device 100 folds or unfolds and, when an external force is applied, it may be easily damaged. For example, coupling or attaching the folding portion 131c of the display 130 to the rigid structure (e.g., the hinge cover 165) may be limited. According to an embodiment, a gap may be formed between the folding portion 131c and its corresponding rigid structure at the edge of the display 130, providing a space to allow the folding portion 131c to be deformed to be curved. According to an embodiment, the gap formed between the folding portion 131c and its corresponding rigid structure may serve as a path along which foreign bodies may come in. According to an embodiment, the electronic device 100 may include a third sealing member (e.g., the sealing member 183 of FIG. 3 or a third sealing member 481a or 481b of FIG. 9 described below), forming a sealing structure between the folding portion 131c and its corresponding rigid structure (e.g., the hinge cover 165). A sealing structure using the third sealing member is described below with reference to FIGS. 9 to 12.

Figure 9:
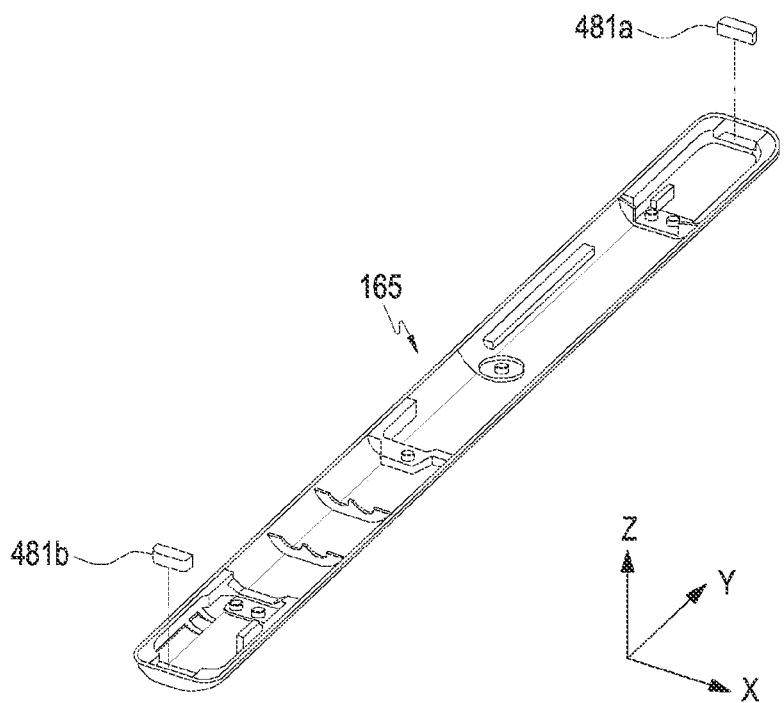
FIG. 9 is an exploded perspective view illustrating a configuration in which a third sealing member is provided in a portable communication device or electronic device according to an embodiment of the disclosure.

FIG. 9 is an exploded perspective view illustrating a configuration in which a third sealing member 481a or 481b (e.g., the sealing member 181 of FIG. 3) is mounted in a portable communication device or electronic device (e.g., the electronic device 100 of FIGS. 1 to 3) according to an embodiment of the disclosure.

Referring to FIG. 9, the electronic device 100 may include at least one third sealing member 481a and 481b provided between the display (e.g., the display 130 of FIG. 3) and the hinge cover (e.g., the hinge cover 165 of FIG. 3). According to an embodiment, a pair of third sealing members 481a and 481b may be provided to contact or attach to the top and bottom, respectively, of the hinge cover 165. According to an embodiment, the third sealing members 481a and 481b may be disposed so that their bottom or side contacts the hinge cover 165. According to an embodiment, the third sealing members 481a and 481b may substantially have their bottom or side attached to the hinge cover 165. When the display 130 is disposed on the hinge cover 165, the third sealing members 481a and 481b may contact the inner surface (e.g., the folding portion 131c of FIG. 2) of the display 130. For example, the third sealing members 481a and 481b may contact two opposite ends of the folding portion 131c at the edge of the display 130, forming a sealing structure between the folding portion 131c and the rigid structure (e.g., the hinge cover 165). According to an embodiment, the third sealing members 481a and 481b may be formed of a low-density elastic material, e.g., sponge. As the third sealing members 481a and 481b are formed of a low-density elastic material, the load applied to the display 130 by elastic force accrued by the third sealing members 481a and 481b may be small despite tight contact with the folding portion 131c in the folding/unfolding operation of the electronic device 100.

Figure 10:
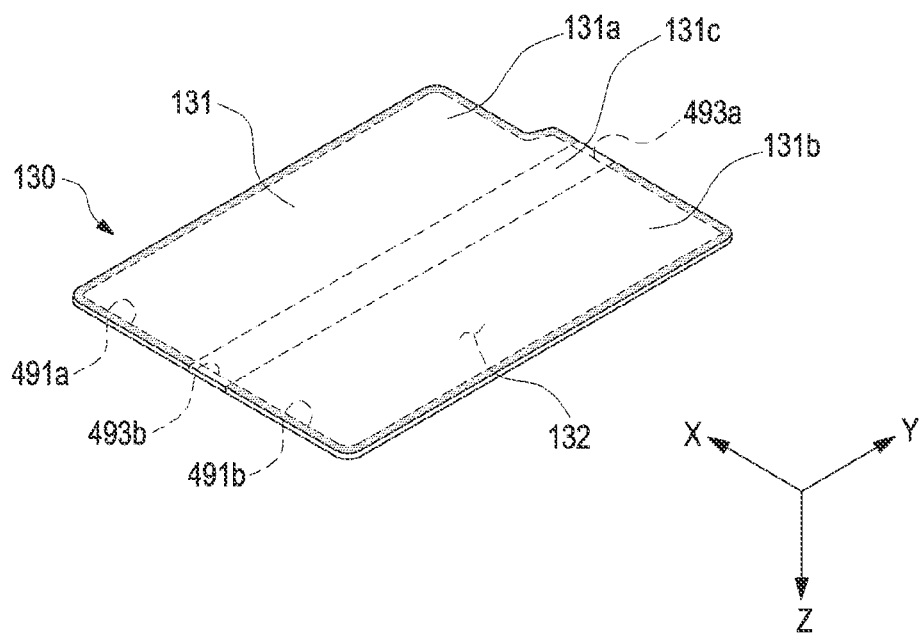
FIG. 10 is a view illustrating a sealing structure formed on a display in a portable communication device or electronic device according to an embodiment of the disclosure.

FIG. 10 is a view illustrating a sealing structure formed on a display 130 in a portable communication device or electronic device (e.g., the electronic device 100 of FIG. 3) according to an embodiment of the disclosure.

Referring to FIG. 10, the first portion 131a and second portion 131b of the display 130 may be mounted in the first housing structure 110 and second housing structure 120, remaining flat even in the folding/unfolding operation of the electronic device 100. For example, the first portion 131a and the second portion 131b may be mounted in the rigid structures. According to an embodiment, the display 130 may include a first attaching area 491a provided along the edge of the first portion 131a and a second attaching area 491b provided along the edge of the second portion 131b. The first attaching area 491a or second attaching area 491b may be mounted on a side surface member (e.g., the first side surface member 113 of FIG. 1 or 2) of a rigid structure, e.g., the first housing structure 110 or a side surface member (e.g., the second side surface member 123 of FIG. 1 or 2) of the second housing structure 120. For example, a sealing structure may be formed between the first portion 131a and the rigid structure (e.g., the first housing structure 110 of FIGS. 1 to 3), corresponding to the first attaching area 491a, and a sealing structure may be formed between the second portion 131*b* and the rigid structure (e.g., the second housing structure 120 of FIGS. 1 to 3), corresponding to the second attaching area 491*b*.

According to an embodiment, the display 130 may include contacting areas 493*a* and 493*b* at two opposite ends of the folding portion 131*c*, in the inner surface thereof. According to an embodiment, the contacting areas 493*a* and 493*b* may be positioned at the edge of the display 130 and abut the first attaching area 491*a* or second attaching area 491*b*. For example, one of the contacting areas 493*a* and 493*b* (e.g., the contacting area denoted with reference number 493*a*) may mean an area between one end of the first attaching area 491*a* and an end of the second attaching area 491*b*, and the other of the contacting areas 493*a* and 493*b* (e.g., the contacting area denoted with reference number 493*b*) may mean an area between the other end of the first attaching area 491*a* and the other end of the second attaching area 491*b*. According to an embodiment, the first attaching area 491*a*, the second attaching area 491*b*, and the contacting areas 493*a* and 493*b* may be combined to form a closed loop or closed curve.

According to an embodiment, when the first attaching area 491*a* is attached to the first housing structure 110, and the second attaching area 491*b* is attached to the second housing structure 120, the contacting areas 493*a* and 493*b* may be positioned corresponding to two opposite ends of the hinge cover 165. According to an embodiment, the third sealing members 481*a* and 481*b* may contact one of the contacting areas 493*a* and 493*b*, forming a sealing structure between an end of the folding portion 131*c* and an end of the hinge cover 165.

Figure 11:
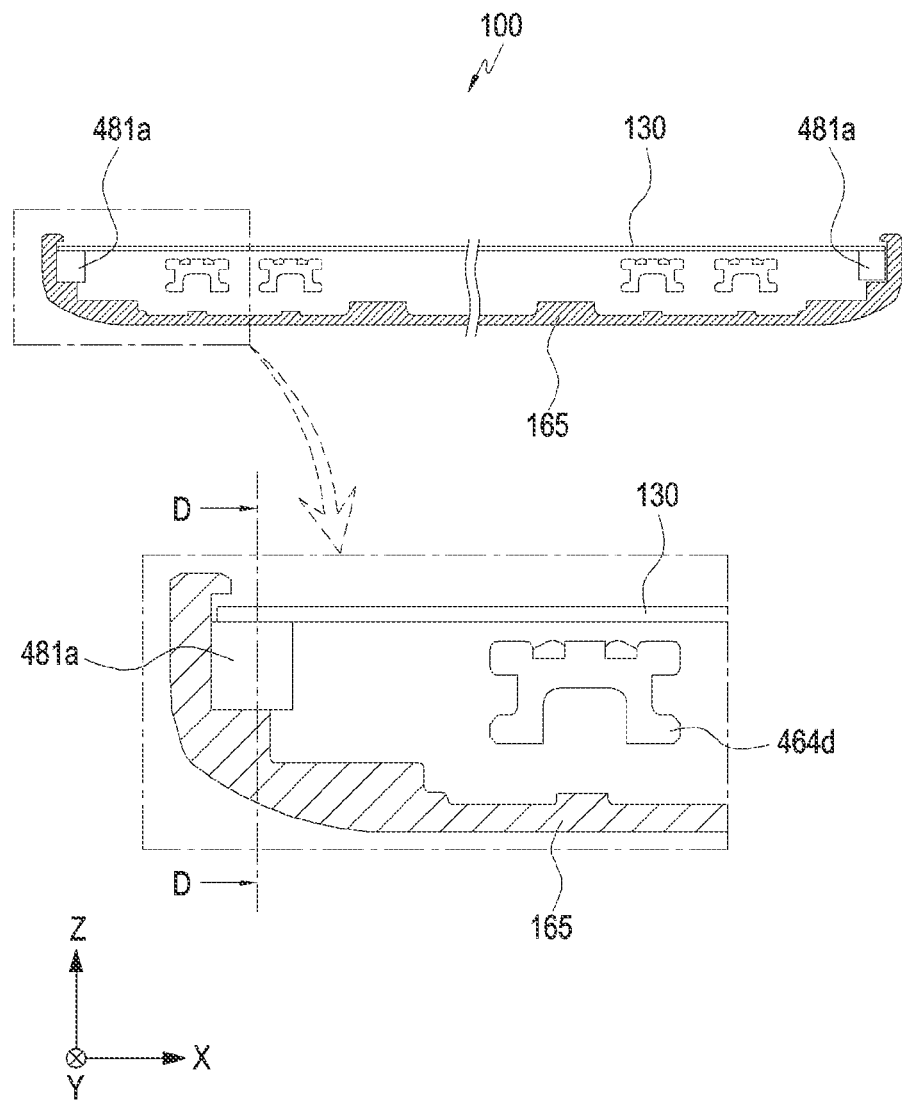
FIG. 11 is a cross-sectional view illustrating a sealing structure formed by a third sealing member in a portable communication device or electronic device according to an embodiment of the disclosure.

FIG. 11 is a cross-sectional view illustrating a sealing structure formed by the third sealing members 481*a* and 481*b* in a portable communication device or electronic device (e.g., the electronic device 100 of FIGS. 1 to 3) according to an embodiment.

Figure 12:
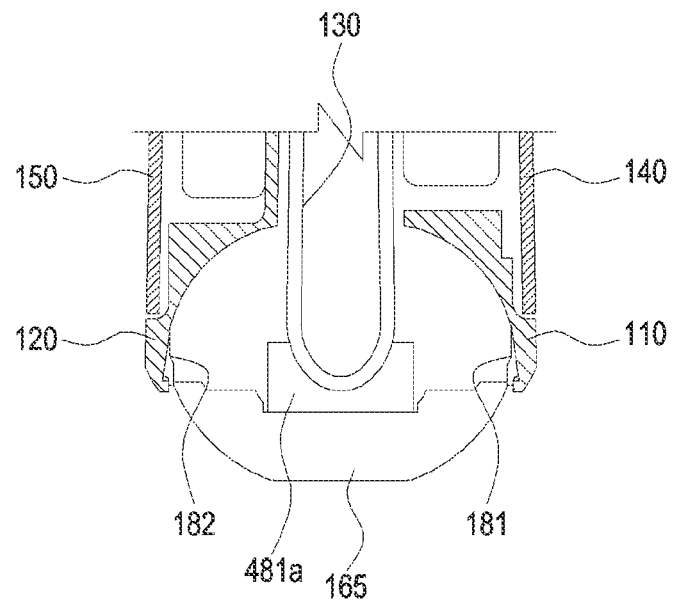
FIG. 12 is a cross-sectional view illustrating a sealing structure formed by a third sealing member in a folded state of a portable communication device or electronic device according to an embodiment of the disclosure.

FIG. 12 is a cross-sectional view illustrating a sealing structure formed by the third sealing member 481*a*, with a portable communication device or electronic device (e.g., the electronic device 100 of FIGS. 1 to 3) folded, according to an embodiment of the disclosure.

Referring to FIG. 11 is a cross-sectional view of the electronic device 100, taken along, e.g., the folding axis A of FIG. 1. Referring to FIG. 11, in the second position, the third sealing member 481*a* may tightly contact the display 130 (e.g., one of the contacting areas 493*a* and 493*b*) while remaining substantially in a polygonal shape, e.g., a cuboid. According to an embodiment, a coupling part(s) 464*d* may be provided in the internal space of the hinge cover 165. The coupling part 464*d* may be provided at, e.g., a hinge plate (e.g., the first hinge plate 164*b* or second hinge plate 164*c* of FIG. 3), and the hinge structure 164*a* of FIG. 3 may be coupled to the first hinge plate 164*b* or second hinge plate 164*c* via the coupling part 464*d*.

FIG. 12 is a cross-sectional view of a portion of the electronic device 100, taken along line D-D of FIG. 11, illustrating a folded state of the first housing structure 110 and the second housing structure 120 in the first position, e.g., as shown in FIG. 2 according to an embodiment of the disclosure. Referring to FIG. 12, in the first position, the display 130, e.g., the folding portion 131*c*, may be at least partially folded or curved, compressing the third sealing member 481*a*. For example, when the display 130 is in the flat shape, the third sealing member 481*a* may be in the state of being maximally extended in the electronic device 100 and, when a portion (e.g., the folding portion 131*c* or the contacting areas 493*a* and 493*b*) of the display 130 is curved, the third sealing member 481*a* may be compressed. The third sealing member 481*a* may be formed of a low-density elastic material, e.g., sponge and, although compressed, the load applied to the display 130 may thus be tiny.

As set forth above, according to an embodiment, as the rigid structures (e.g., the first housing structure 110, second housing structure 120, and hinge cover 165 of FIGS. 1 to 3) are moved to each other or rotatably coupled together, the first sealing member or second sealing member (e.g., the first sealing member 181 or second sealing member 182 of FIG. 3) may form a stable sealing structure between the rigid structures. For example, the electronic device 100 (e.g., the electronic device 100 of FIGS. 1 to 3) may be folded or rolled up in structure while preventing influx of foreign bodies into the inside via the gap between the rigid structures.

According to an embodiment, for the portion that remains flat upon mounting the display (e.g., the display 130 of FIG. 3 or 10), the edges (e.g., the first attaching area 491*a* and the second attaching area 491*b*) of the display may directly be attached to the rigid structures (e.g., the first housing structure 110 and second housing structure 120 of FIGS. 1 to 3). According to an embodiment, in the portions (e.g., the contacting areas 493*a* and 493*b* of FIG. 10) of the display, which are supposed to be curved, the third sealing members (e.g., the third sealing members 481*a* and 481*b* of FIG. 9 or 11) may form a sealing structure. For example, the overall edge of the display 130 may be directly attached to the rigid structures to thereby form a sealing structure but, in the portions of the display 130, which are to be curved, the third sealing members 481*a* and 481*b* may form a sealing structure. According to an embodiment, the areas (e.g., the first attaching area 491*a* and second attaching area 491*b* of FIG. 10) attached to the rigid structures in the edge of the display 130 and the areas (e.g., the contacting areas 493*a* and 493*b* of FIG. 10), which contact the third sealing members 481*a* and 481*b*, may be combined to form a closed curve. For example, the path along which foreign bodies may enter between the display 130 and the rigid structure may be blocked off.

Figure 13:
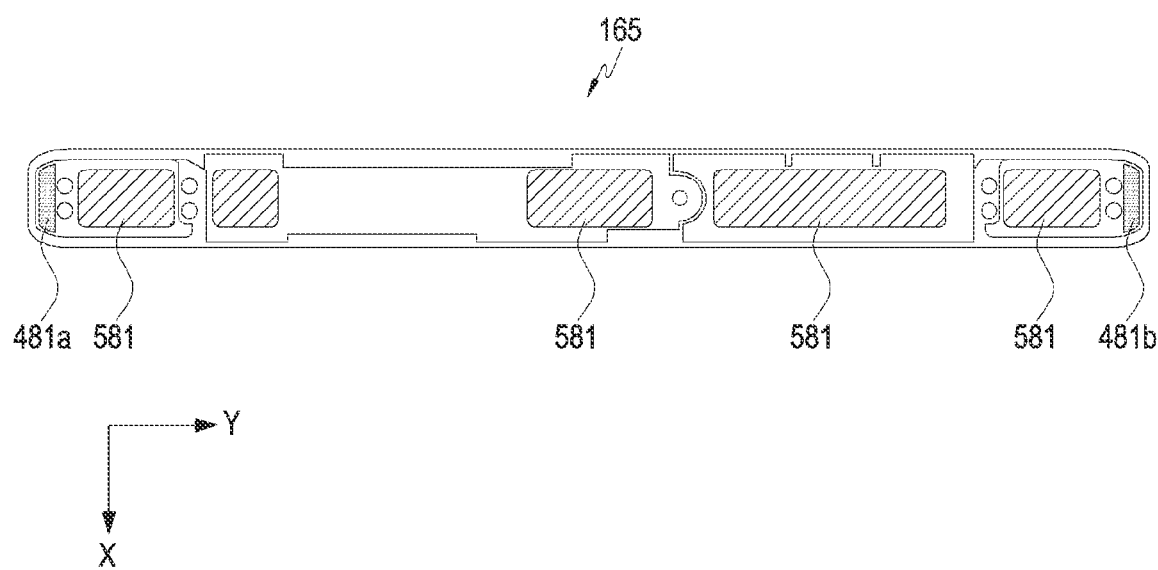
FIG. 13 is a plan view illustrating a hinge cover of a portable communication device or electronic device according to an embodiment of the disclosure.

FIG. 13 is a plan view illustrating a hinge cover (e.g., the hinge cover 165 of FIGS. 1 to 3) in a portable communication device or electronic device (e.g., the electronic device 100 of FIGS. 1 to 3) according to an embodiment of the disclosure.

Referring to FIG. 13, the electronic device 100 may further include a first sticky layer 581 provided in the internal space of the electronic device 100. The first sticky layer 581 may include a gluing agent and allow foreign bodies present or moving inside or around the electronic device 100 to stick thereto. For example, the first sticky layer 581 may prevent free movement of, or contamination of the internal components by foreign bodies inside the electronic device 100. According to an embodiment, the first sticky layer 581 may be formed on an inner surface of the hinge cover (e.g., the hinge cover 165 of FIGS. 1 to 3). For example, a gluing agent may be directly applied to the inner space of the hinge cover 165, or a gluing agent-applied film-type base material may be attached, in an adequate position, to the inside of the electronic device 100, thereby forming the first sticky layer 581.

According to an embodiment, the structures, e.g., the first housing structure 110, second housing structure 120, hinge structure 164*a*, first hinge plate 164*b*, and second hinge plate 164*c*, may frequently move or rotate with respect to each other, around the hinge cover 165. Placing the above-described first sealing member 181, second sealing member 182, and third sealing members 481a and 481b may largely block influx of foreign bodies, but there is a chance of foreign bodies coming in due to relative movement of the structures. According to an embodiment, the first sticky layer 581 may be provided on the inner surface of the hinge cover 165 and foreign bodies coming in from around the hinge cover 165, if any, may stick to the first sticky layer 581. For example, the first sticky layer 581 may be provided to stop foreign bodies from moving, thereby preventing contamination or damage to the mechanical or electronic components inside the electronic device 100.

FIGS. 14, 15, 16, 17, 18, and 19 are cross-sectional views illustrating a modified first sealing member or second sealing member in a portable communication device or electronic device according to various embodiments of the disclosure.

Figure 14:
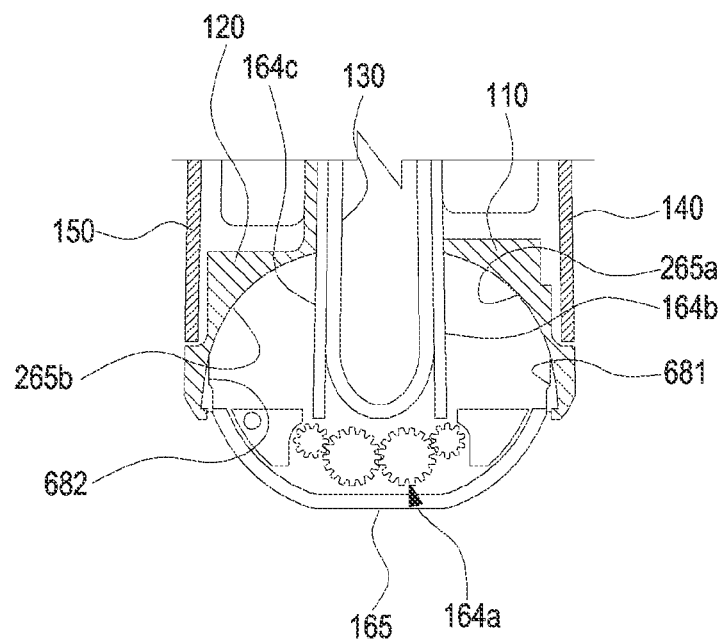
FIGS. 14, 15, 16, 17, 18, and 19 are cross-sectional views illustrating a modified first sealing member or second sealing member in a portable communication device or electronic device according to various embodiments of the disclosure.
Figure 15:
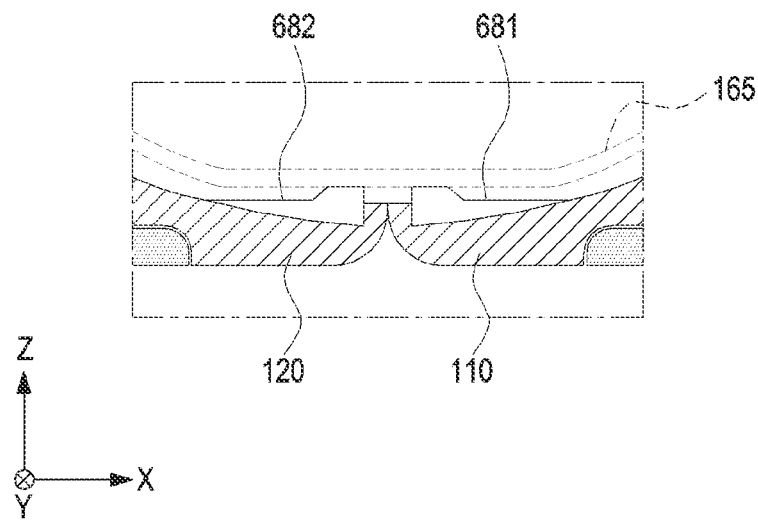

Referring to FIGS. 14 and 15, a first sealing member 681 may be disposed on a curved surface 265a of the first housing structure 110, and a second sealing member 682 may be disposed on a curved surface 265b of the second housing structure 120. According to an embodiment, the first sealing member 681 and the second sealing member 682 may be shaped to partially stick out, and they may at least partially contact the outer circumferential surface of the hinge cover 165. According to an embodiment, in contact with the outer circumferential surface of the hinge cover 165, the first sealing member 681 and the second sealing member 682 may be compressed and accumulate elastic force. For example, the first sealing member 681 and the second sealing member 682 may seal off the gap formed between the outer circumferential surface of the hinge cover 165 and each curved surface 265a and 265b, stopping foreign bodies (e.g., dust, chips, or other solid particles) from entering the electronic device 100 (e.g., the electronic device 100 of FIGS. 1 to 3) from the outside. While the electronic device 100 folds or unfolds, the first sealing member 681 and the second sealing member 682 may slide and contact the outer circumferential surface of the hinge cover 165 and they may include a low friction-factor material, e.g., fabric or lubricative high-polymer material, preventing noise or wear.

According to an embodiment, the hinge structure (e.g., the hinge structure 164a of FIG. 3), from a structure perspective, may be a combination of a plurality of gears, and the hinge structure may couple the first hinge plate 164b and the second hinge plate 164c to be rotatable with respect to each other. According to an embodiment, the hinge structure 164a may be coupled with the first hinge plate 164b or second hinge plate 164c via the coupling part 464d of FIG. 11. In the cross-sectional view of FIG. 14, when the hinge structure 164a includes an even number of gears, the first housing structure 110 and the second housing structure 120 may be rotated reversely with respect to each other. For example, in FIG. 14, when the first housing structure 110 rotates clockwise on the hinge structure 164a, the second housing structure 120 may rotate counterclockwise on the hinge structure 164a.

Figure 16:
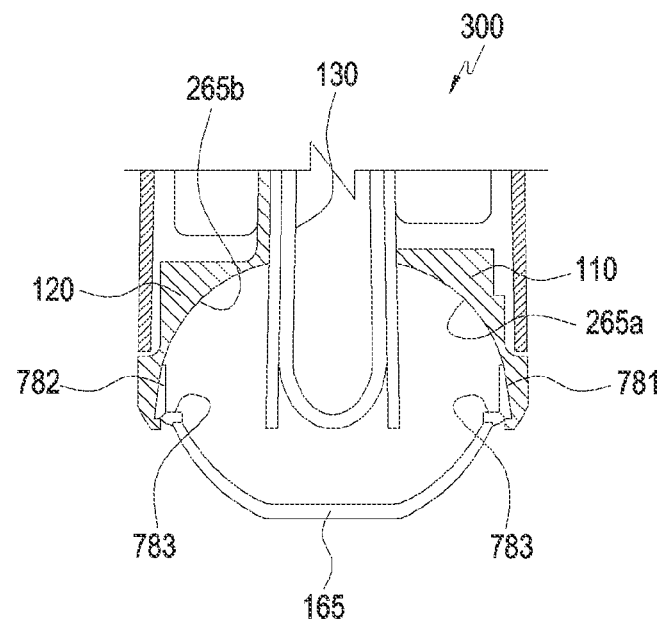
Figure 17:
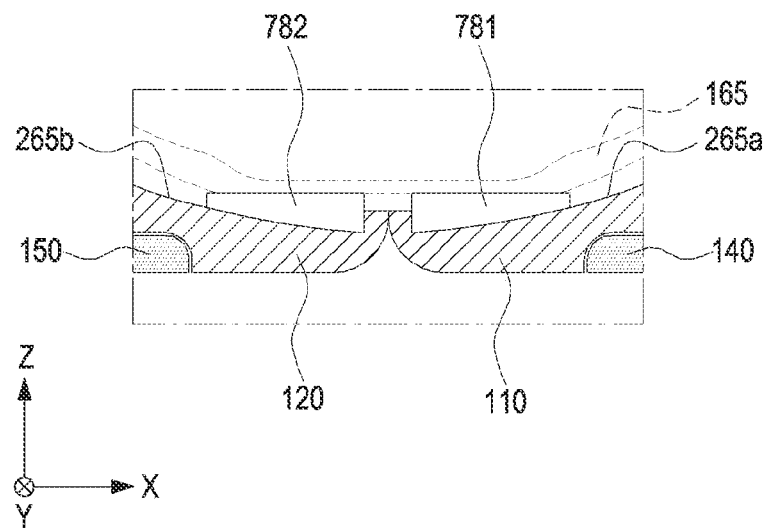

Referring to FIGS. 16 and 17, the first sealing member 781 and the second sealing member 782 each may be mounted on a curved surface 265b of the second housing structure 120. According to an embodiment, the electronic device (e.g., the electronic device 100 of FIGS. 1 to 3) may further include interfering members 783 disposed at two opposite edges of the hinge cover 165. The interfering members 783 may extend in the lengthwise direction (e.g., the y direction of FIG. 3) and may be mounted or attached to the hinge cover 165. For example, the interfering members 783 may extend substantially in the y direction of FIG. 3 and be disposed on the hinge cover 165 in parallel with the first sealing member 781 or second sealing member 782. As shown in FIG. 16, the interfering members 783 may be interfered with by the first sealing member 781 and second sealing member 782 in the first position.

According to an embodiment, the interfering members 783 may include an elastic material and, when interfered with by the first sealing member 781 or second sealing member 782, they may be compressed while accruing elastic force. For example, at least in the first position, the interfering members 783 may stably maintain the sealing structure formed between the outer circumferential surface of the hinge cover 165 and each curved surface 265a and 265b. As interfering with the interfering members 783, the first sealing member 781 and the second sealing member 782 may also be compressed, accumulating elastic force.

According to an embodiment, in the first position, the first sealing member 781 and the second sealing member 782 may be in the state of contacting or interfering with the interfering members 783, as much as a first area. When the first housing structure and/or second housing structure (e.g., the first housing structure 110 and/or second housing structure 120 of FIGS. 1 to 3) rotate to unfold, the first sealing member 781 and the second sealing member 782 may be brought in contact or tight contact with the outer circumferential surface of the hinge cover 165, as much as a second area. While contacting or tightly contacting the outer circumferential surface of hinge cover 165, the first sealing member 781 and the second sealing member 782 may add up less elastic force than when interfering with the interfering members 783. According to an embodiment, the second area (e.g., the area of contacting, or tightly contacting, the outer circumferential surface of the hinge cover 165) may be larger than the first area (e.g., the area of contacting or interfering with the interfering members 783). For example, even without interference with the interfering members 783, the first sealing member 781 and the second sealing member 782 may maintain a stable sealing structure between the outer circumferential surface of the hinge cover 165 and each curved surface 265a and 265b.

Figure 18:
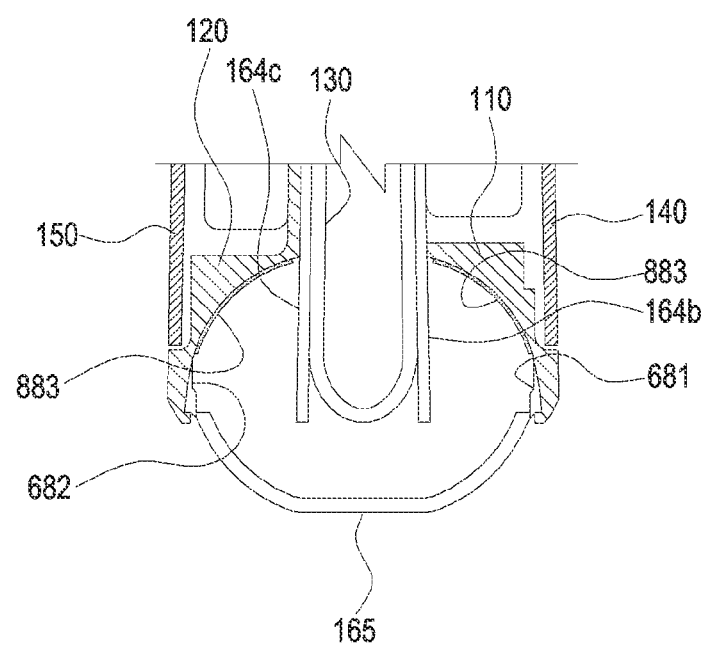

Referring to FIG. 18, the electronic device (e.g., the electronic device 100 of FIGS. 1 to 3) may include a second sticky layer 883 formed in the first housing structure 110 or second housing structure 120. The second sticky layer 883 may include a gluing material applied to a curved surface (e.g., the curved surface 265a or 265b of FIG. 4) of the first housing structure 110 or second housing structure 120. According to an embodiment, the second sticky layer 883, along with the first sticky layer 581, may allow foreign bodies present or moving in the space surrounded by, at least, the hinge cover 165 to stick thereto. For example, the second sticky layer 883 may prevent free movement of, or contamination of the internal components by a foreign body inside the electronic device 100. According to an embodiment, the second sticky layer 883 may be formed by directly applying a gluing material to the curved surface 265a or 265b or by attaching a gluing material-applied film-type base material.

Figure 19:
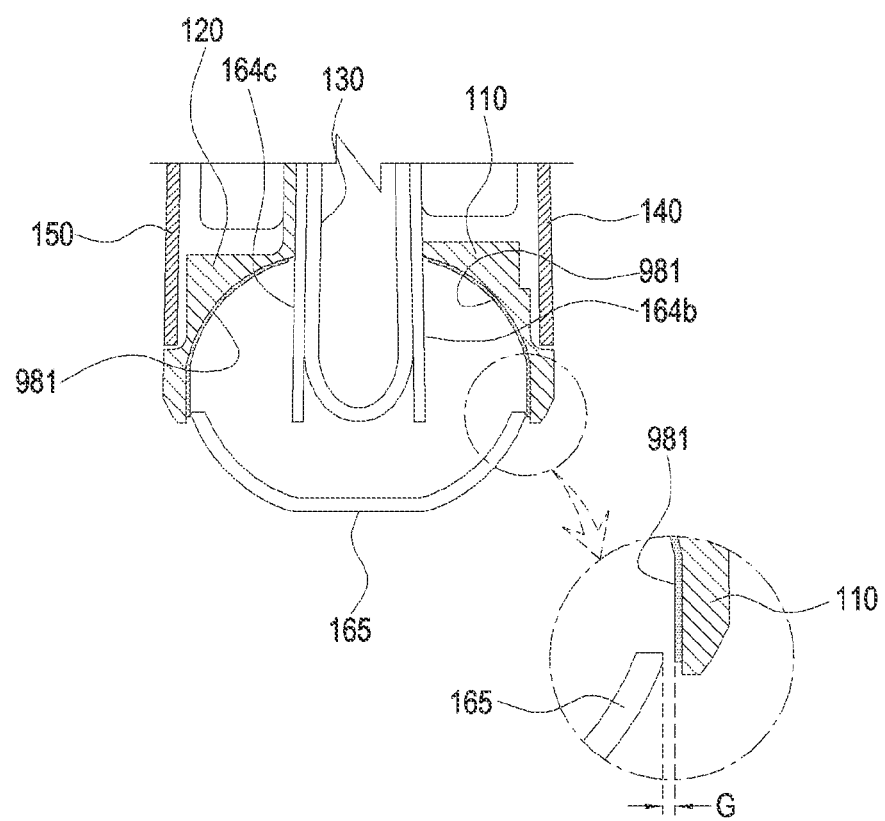

Referring to FIG. 19, the electronic device (e.g., the electronic device 100 of FIGS. 1 to 3) may include a third sticky layer 981 formed in the first housing structure 110 or second housing structure 120. The third sticky layer 981 may include a gluing material applied to a curved surface (e.g., the curved surface 265a or 265b of FIG. 4) of the first housing structure 110 or second housing structure 120.

According to an embodiment, the third sticky layer 981 may be formed on substantially the overall curved surface 265a or 265b. For example, the first sealing member or second sealing member (e.g., the first sealing member 181 or second sealing member 182) may be omitted, and a portion of the third sticky layer 981 may be disposed in at least a portion of the area to which the first sealing member 181 or second sealing member 182 of FIG. 4 is attached in the curved surface 265a or 265b. The third sticky layer 981, along with the first sticky layer 581, may allow foreign bodies present or moving in the space surrounded by, at least, the hinge cover 165 to stick thereto. For example, the second sticky layer 883 may prevent free movement of, or contamination of the internal components by a foreign body inside the electronic device 100. According to an embodiment, the second sticky layer 883 may be formed by directly applying a gluing material to the curved surface 265a or 265b or by attaching a gluing material-applied film-type base material. According to an embodiment, a gap G of about 0.1 mm may be formed between the third sticky layer 981 and the hinge cover 165. For example, the third sticky layer 981 may allow foreign bodies entering the internal space (e.g., the space at least partially surrounded by the hinge cover 165) to stick to it without direct contact with the outer circumferential surface of the hinge cover 165. According to an embodiment, when the electronic device 100 deforms between the first position and the second position, the third sticky layer 981 may move about the hinge cover 165 while facing a portion of the outer circumferential surface of the hinge cover 165.

Figure 20:
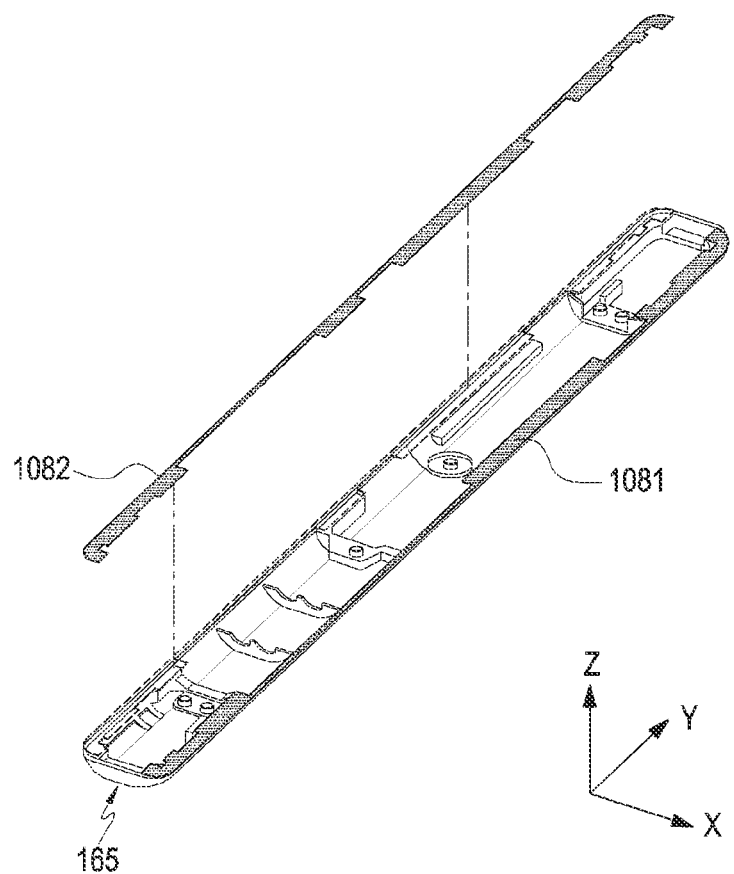
FIG. 20 is an exploded perspective view illustrating a structure in which a first sealing member or second sealing member is provided in a portable communication device or electronic device according to an embodiment of the disclosure.
Figure 21:
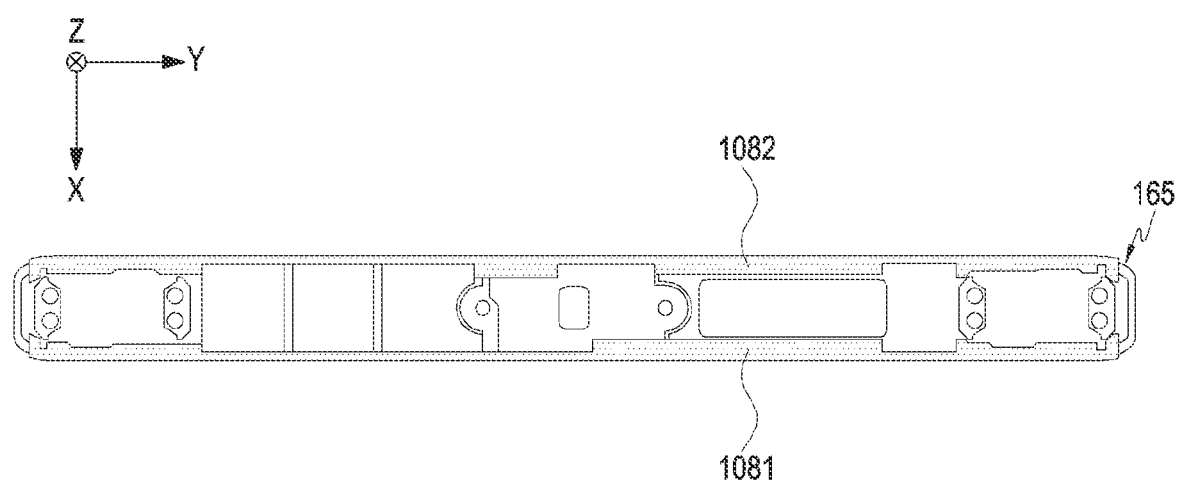
FIG. 21 is a plan view illustrating a structure in which a first sealing member or second sealing member is provided in a portable communication device or electronic device according to an embodiment of the disclosure.

FIG. 20 is an exploded perspective view illustrating another example of the structure in which a first sealing member 1081 or second sealing member 1082 is mounted in a portable communication device or electronic device (e.g., the electronic device 100 of FIG. 1 or 2) according to an embodiment of the disclosure. FIG. 21 is a plan view illustrating a structure in which a first sealing member or second sealing member is provided in a portable communication device or electronic device according to an embodiment of the disclosure.

Referring to FIGS. 20 and 21, the first sealing member 1081 or second sealing member 1082 each may be mounted at a respective one of two opposite ends of the hinge cover 165. Here, the "edge (or periphery) of the hinge cover 165" may be interpreted as including an edge or periphery of one surface or area of the hinge cover 165 facing the front surface of the electronic device (e.g., the electronic device 100 of FIG. 1), with the housing structures (e.g., the first housing structure 110 and second housing structure 120 of FIG. 1) unfolded as shown in FIG. 1. As described with reference to FIG. 22 or 23, a portion of the first sealing member 1081 or a portion of the second sealing member 1082 may protrude from the outer circumferential surface of the hinge cover 165. According to an embodiment, the first sealing member 1081 or second sealing member 1082 may seal off the gaps between the hinge cover 165 and the housing structures 110 and 120 without being substantially positioned between the housing structures 110 and 120 (e.g., the curved surfaces 265a and 265b of FIG. 4) and the hinge cover 165.

According to an embodiment, the first sealing member 1081 or second sealing member 1082 may be fastened to the hinge cover 165 by attaching, fusion, or welding. According to an embodiment, the first sealing member 1081 or second sealing member 1082 may be fastened to the hinge cover 165 via a coupling structure, e.g., a snap-fit structure or screw. According to an embodiment, the hinge cover 165 may have a slit(s) extending along its lengthwise direction, and the first sealing member 1081 or second sealing member 1082 may be fastened, partially inserted into the slit formed in the hinge cover 165.

According to an embodiment, the first sealing member 1081 or second sealing member 1082 may be a plate of rigid material, formed of, e.g., a metal, e.g., SUS. According to an embodiment, when the first housing structure 110 or the second housing structure 120 rotates, the first sealing member 1081 or second sealing member 1082 may slide and contact the inner surface (e.g., the curved surface 265a or 265b of FIG. 4) of the first housing structure 110 or second housing structure 120. In the structure of sliding and contacting the curved surface 265a or 265b, the first sealing member 1081 or second sealing member 1082 may be formed of a synthetic resin, e.g., an acetal resin with superior mechanical strength and lubricity. According to an embodiment, the first sealing member 1081 or second sealing member 1082 may include silicone, sponge, or a fabric surrounding sponge.

Figure 22:
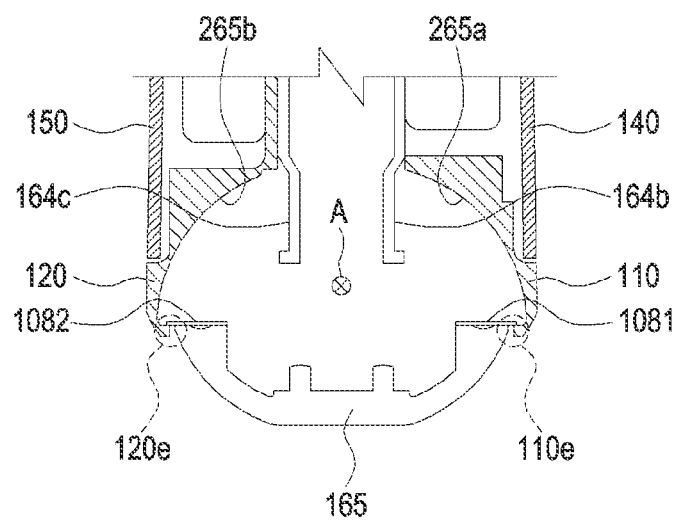
FIGS. 22 and 23 are cross-sectional views illustrating a modified first sealing member or second sealing member in a portable communication device or electronic device according to various embodiments of the disclosure.
Figure 23:
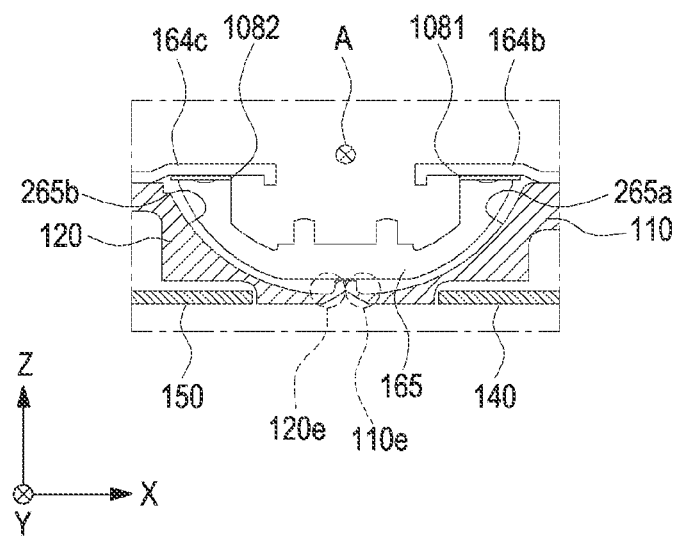

FIGS. 22 and 23 are cross-sectional views illustrating a modified first sealing member 1081 or second sealing member 1082 in a portable communication device or electronic device (e.g., the electronic device 100 of FIG. 1 or 2) according to various embodiments of the disclosure.

Referring to FIGS. 22 and 23, the first housing structure 110 or second housing structure 120 may include a bend(s) 110e or 120e in a portion of its edge, e.g., at the edge of the curved surface 265a or 265b. According to an embodiment, the bends 110e and 120e may be arranged to be substantially symmetrical with each other and may be aligned substantially in parallel with the direction of radius of curvature of the curved surface 265a or 265b or the direction of radius of curvature of the outer circumferential surface of the hinge cover 165. For example, if the curved surface 265a or 265b or the outer circumferential surface of the hinge cover 165 extends along the circumferential direction with respect to the folding axis A (e.g., the folding axis A of FIG. 1), the end faces of the bends 110e and 120e may be arranged to face the folding axis A.

According to an embodiment, in the cross-sectional view of FIG. 22 or 23, the first sealing member 1081 and second sealing member 1082 are mounted on two opposite top edges of the hinge cover 165, and a portion of the first sealing member 1081 or second sealing member 1082 may protrude from the outer circumferential surface of the hinge cover 165. According to an embodiment, in the state of the first housing structure 110 and the second housing structure 120 being folded to face each other, e.g., in the first position of FIG. 2, the first sealing member 1081 may be disposed to tightly contact a first bend 110e of the bends 110e and 120e, and the second sealing member 1082 may be disposed to tightly contact a second bend 120e of the bends 110e and 120e. According to an embodiment, the sealing members 1081 and 1082 may be disposed to seal off the gaps between the outer circumferential surface of the hinge cover 165 and the bends 110e and 120e. For example, in the first position, the first sealing member 1081 may seal off the gap between the end face of the first bend 110e and the outer circumferential surface of the hinge cover 165, and the second sealing member 1082 may seal off the gap between the end face of the second bend 120e and the outer circumferential surface of the hinge cover 165. According to an embodiment, a portion of one surface of the first sealing member 1081 may tightly contact the hinge cover 165, and another portion of the surface of the first sealing member 1081 may tightly contact the first housing structure 110, e.g., the first bend 110e. Similar to the first sealing member 1081, a portion of one surface of the second sealing member 1082 may tightly contact the hinge cover 165, and another portion of the surface of the second sealing member 1082 may tightly contact the second housing structure 120, e.g., the first bend 120e. According to an embodiment, in the state of the first housing structure 110 and the second housing structure 120 being unfolded side-by-side, e.g., in the second position of FIG. 1, the first sealing member 1081 or second sealing member 1082 may contact the first hinge plate 164b or second hinge plate 164c. For example, in the second position, the first sealing member 1081 or second sealing member 1082 may seal off the gap between the hinge plate 164b or 164c and the hinge cover 165.

As such, the first sealing member 1081 or second sealing member 1082, at least in the first position or second position, may seal the internal space (e.g., the space where the folding axis A is positioned) of the hinge cover 165 off the other space. According to an embodiment, the first sealing member 1081 or second sealing member 1082 may slide and contact the inner surface (e.g., the curved surface 265a or 265b) of the first housing structure 110 or second housing structure 120. For example, when the housing structures 110 and 120 rotate on each other, the first sealing member 1081 or the second sealing member 1082 may slidingly contact the curved surface 265a or 265b, sealing off the gap between the hinge cover 165 and the curved surface 265a or 265b.

Figure 24:
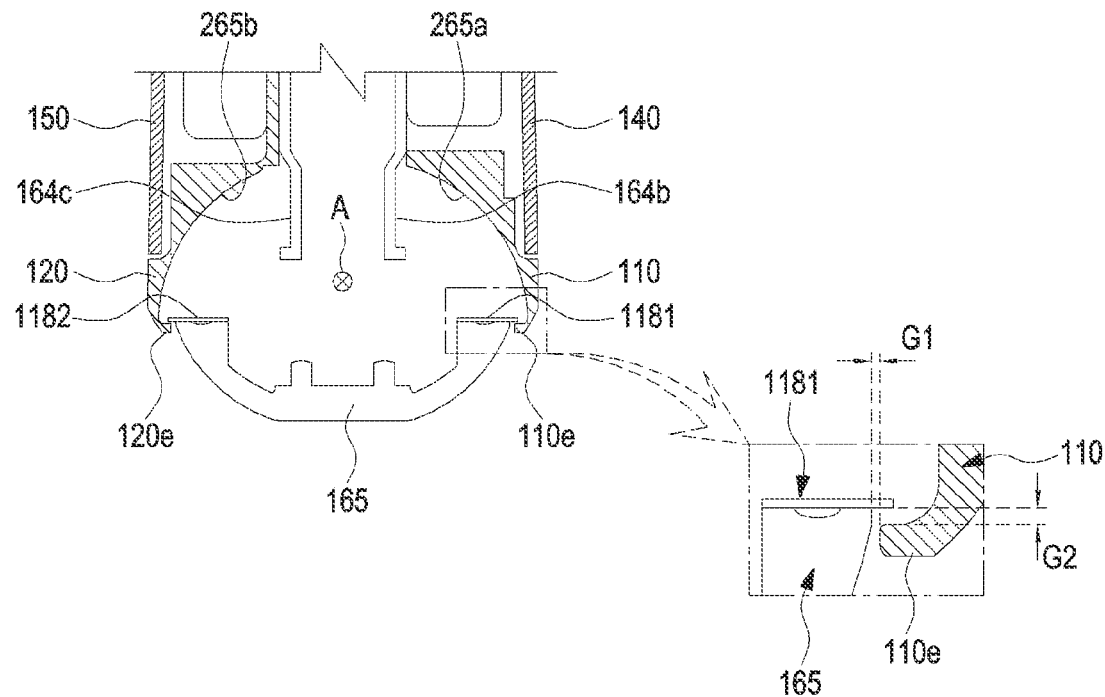
FIGS. 24 and 25 are cross-sectional views illustrating a modified portable communication device or electronic device according to various embodiments of the disclosure.
Figure 25:
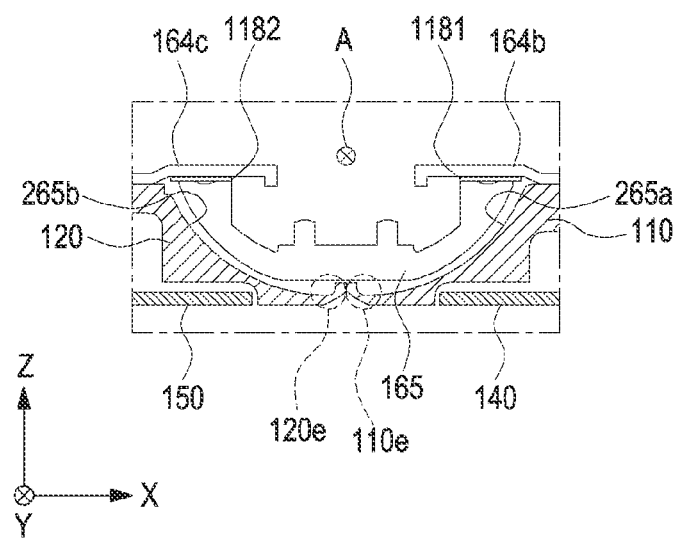

FIGS. 24 and 25 are cross-sectional views illustrating a modified portable communication device or electronic device (e.g., the electronic device 100 of FIG. 1 or 2) according to various embodiments of the disclosure.

Referring to FIGS. 24 and 25, the electronic device may include dummy members 1181 and 1182 (e.g., the sealing members 1081 and 1082 of FIGS. 20 to 23) provided in the hinge cover 165. According to an embodiment, the dummy members 1181 and 1182 may be formed integrally with, or separately from the hinge cover 165 and, if formed separately from the hinge cover 165, the dummy members 1181 and 1182 may be assembled or attached to the hinge cover 165. According to an embodiment, the dummy members 1181 and 1182, albeit being similar to the sealing members (e.g., the sealing members 1081 and 1082 of FIG. 23) in the foregoing embodiments, may not contact the first housing structure 110 or second housing structure 120. For example, in the first position, the dummy members 1181 and 1182 may be disposed to face the first housing structure 110 or second housing structure 120 to partially hide the gaps (e.g., first gaps G1) between the hinge cover 165 and the housing structures 110 and 120 or, with predetermined gaps (e.g., second gaps G2) left therebetween. As such, some portions of the dummy members 1181 and 1182 in, at least, the first position, may hide the gaps between the hinge cover 165 and the housing structures 110 and 120, and other portions of the dummy members 1181 and 1182 may be disposed to face the inner surfaces of the housing structures 110 and 120.

The first gaps G1 may be formed to be small enough to prevent influx of foreign bodies from the outside. However, the disclosure is not limited to such a specific embodiment and, as described above in connection with the foregoing embodiments, the dummy members 1181 and 1182 may seal off the gaps formed between the hinge cover 165 and the housing structures 110 and 120. The first gap G1 may be the distance between the hinge cover 165 and the first housing structure 110 (or second housing structure 120) which is measured in the horizontal direction of FIG. 24, and the first gap G1 may be about 0.05 mm. However, the first gap G1 between the hinge cover 165 and the housing structure 110 or 120 is not limited to the specific value. For example, the first gap G1 may be designed with various values considering the rotation of the housing structures 110 and 120 or cutoff of influx of foreign bodies.

According to an embodiment, the dummy members 1181 and 1182 may be, e.g., metal plates and may include a first dummy member 1181 mounted on a side edge of the hinge cover 165 and a second dummy member 1182 mounted on its opposite side edge of the hinge cover 165. According to an embodiment, the first dummy member 1181 and the second dummy member 1182 may partially protrude to the outside of the hinge cover 165. For example, when viewed from the outside of the hinge cover 165 in the first position (e.g., the state as shown in FIG. 5) in which the first housing structure 110 and the second housing structure 120 are folded to face each other, a portion of the first dummy member 1181 may be exposed to the outside via the gap, e.g., the first gap G1, between the hinge cover 165 and the first housing structure 110. According to an embodiment, when viewed from the outside of the hinge cover 165 in the first position, a portion of the second dummy member 1182 may be exposed to the outside via the gap between the hinge cover 165 and the second housing structure 120. For example, the first dummy member 1181 and the second dummy member 1182 may at least partially hide the gaps between the hinge cover 165 and the housing structures 110 and 120. According to an embodiment, the first dummy member 1181 and the second dummy member 1182 may at least partially block off foreign bodies entering from the outside via the gaps (e.g., the first gaps G1). In this embodiment, the first dummy member 1181 or second dummy member 1182 is exposed to the outside via the first gap G, but the disclosure is not limited thereto. For example, when an end of the first bend 110e has a shape including an inclined surface or curved surface corresponding to the outer circumferential surface of the hinge cover 165, there may be gaps between the hinge cover 165 and the housing structures 110 and 120, but the first dummy member 1181 or second dummy member 1182 may be invisible to the outside. According to an embodiment, the first gaps G1 may be small enough not to be identified with the naked eye and, although there are gaps between the hinge cover 165 and the housing structures 110 and 120, the first dummy member 1181 or second dummy member 1182 may be invisible to the outside.

According to an embodiment, in the first position, a portion of the first dummy member 1181 may be disposed to face the inner surface (e.g., the first bend 110e of FIG. 23) of the first housing structure 110. For example, in the first position, a portion of the first dummy member 1181 and the inner surface of the first housing structure 110 may be arranged to face each other while leaving a second gap G2 therebetween. The second gap G2 may be the distance between the first dummy member 1181 and the first housing structure 110, as measured in the vertical direction of FIG. 24, which may be about 0.13 mm. According to an embodiment, in the first position, the second dummy member 1182 may be disposed to face the inner surface of the second housing structure 120 while leaving the second gap G2. The specific values for the second gap G2 between the first dummy member 1181 and the first housing structure 110 or between the second dummy member 1182 and the second housing structure 120 are merely an example, and the disclosure is not limited thereto. For example, the second gap G2 may be designed with various values considering the rotation of the housing structures 110 and 120 or cutoff of influx of foreign bodies. According to an embodiment, as described above in connection with the foregoing embodiments, the first dummy member 1181 or second dummy member 1182 may come in contact with the inner surface of the first housing structure 110 or second housing structure 120, sealing off the gap between the hinge cover 165 and the housing structure 110 or 120.

According to an embodiment, the embodiment of the structure including the dummy members 1181 and 1182, in combination with the sealing members (e.g., the third sealing members 481*a* and 481*b*) of FIGS. 9 to 12, may be disposed in the electronic device (e.g., the electronic device 100 of FIG. 1 or 2). Although the dummy members 1181 and 1182 include metal plates, as an example, in the instant embodiment, the disclosure is not limited thereto. For example, the dummy members 1181 and 1182 may be formed of an elastic material, e.g., sponge or rubber, or a synthetic resin film that is rigid but thin enough to provide flexibility. According to an embodiment, the dummy members 1181 and 1182 may be formed of a composite material of at least two of a metal plate, an elastic material, and a synthetic resin film.

Figure 26:
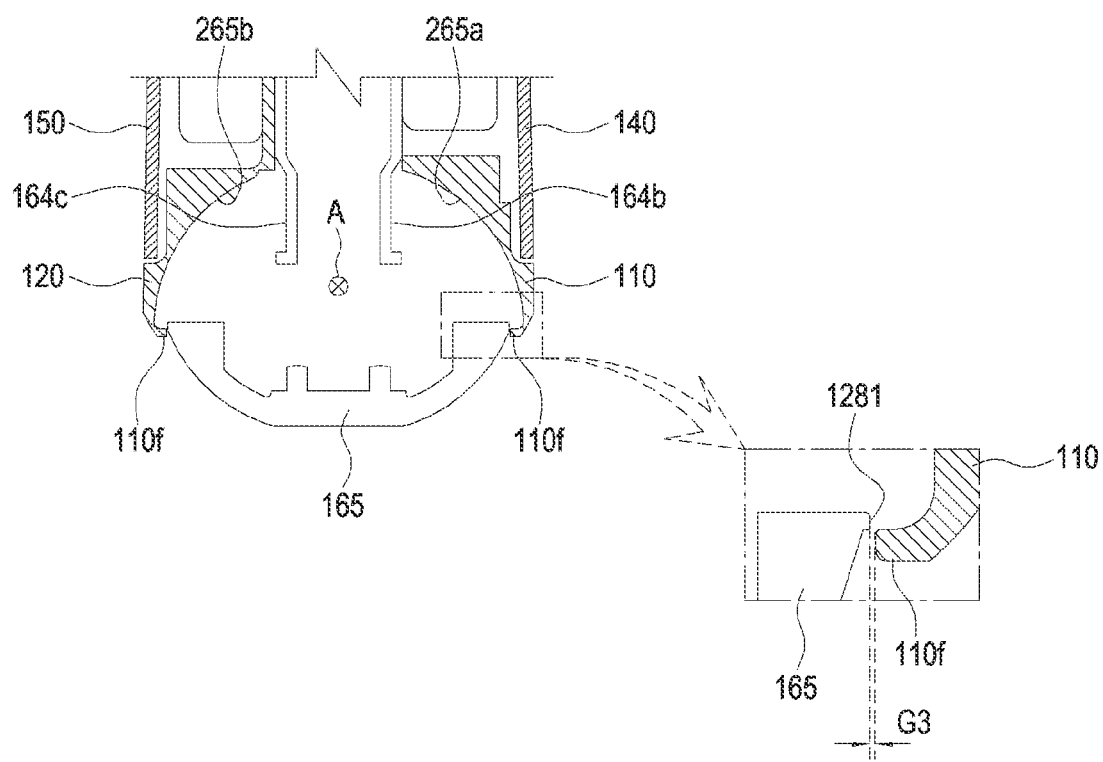
FIG. 26 is a cross-sectional view illustrating a modified portable communication device or electronic device according to an embodiment of the disclosure.

FIG. 26 is a cross-sectional view illustrating a modified portable communication device or electronic device (e.g., the electronic device 100 of FIG. 1 or 2) according to an embodiment of the disclosure.

Referring to FIG. 26, in the first position, a third gap G3 may be formed between the hinge cover 165 and each housing structure 110 and 120. The third gap G3 may be smaller than the first gap G1 of FIG. 24, and the third gap G3 may be, e.g., about 0.03 mm According to an embodiment, to form the third gap G3 smaller than the first gap G1, the housing structure 110 or 120 (e.g., the first housing structure 110) may include a first protrusion 110*f*, and the hinge cover 165 may include a second protrusion 1281. In the first position, the first protrusion 110*f* may be positioned adjacent to the second protrusion 1281, and the third gap G3 may substantially mean the distance between the first protrusion 110*f* and the second protrusion 1281.

According to an embodiment, the first protrusion 110*f* (or the second protrusion 1281) may be of the shape of the metal forming the first housing structure 110 (or the hinge cover 165). According to an embodiment, the first protrusion 110*f* (or the second protrusion 1281) may be a portion of a painted or coated layer and may be formed on the surface of the metal forming the first housing structure 110 (or the hinge cover 165). According to an embodiment, the first protrusion 110*f* (or the second protrusion 1281) may be formed by additionally painting or coating a required portion (e.g., the edge of the outer circumferential surface of the hinge cover 165), on the surface of the metal forming the first housing structure 110 (or the hinge cover 165). According to an embodiment, the first protrusion 110*f* may be formed of a synthetic resin by joining (e.g., by welding) another metal member to the first housing structure 110 or by insert-molding. According to an embodiment, when the first housing structure 110 is formed of a synthetic resin, the first protrusion 110*f* may be formed of a synthetic resin via dual injection molding. According to an embodiment, the first protrusion 110*f* may include a tape or a member attached to the first housing structure 110 or the second housing structure 120 via a tape. For example, the first protrusion 110*f* may stick out from the inner surface of the first housing structure 110, as long as the thickness of the tape and/or the member attached by a tape. According to an embodiment, the member attached by a tape may include an injection-molded article or a metal structure.

Figure 27:
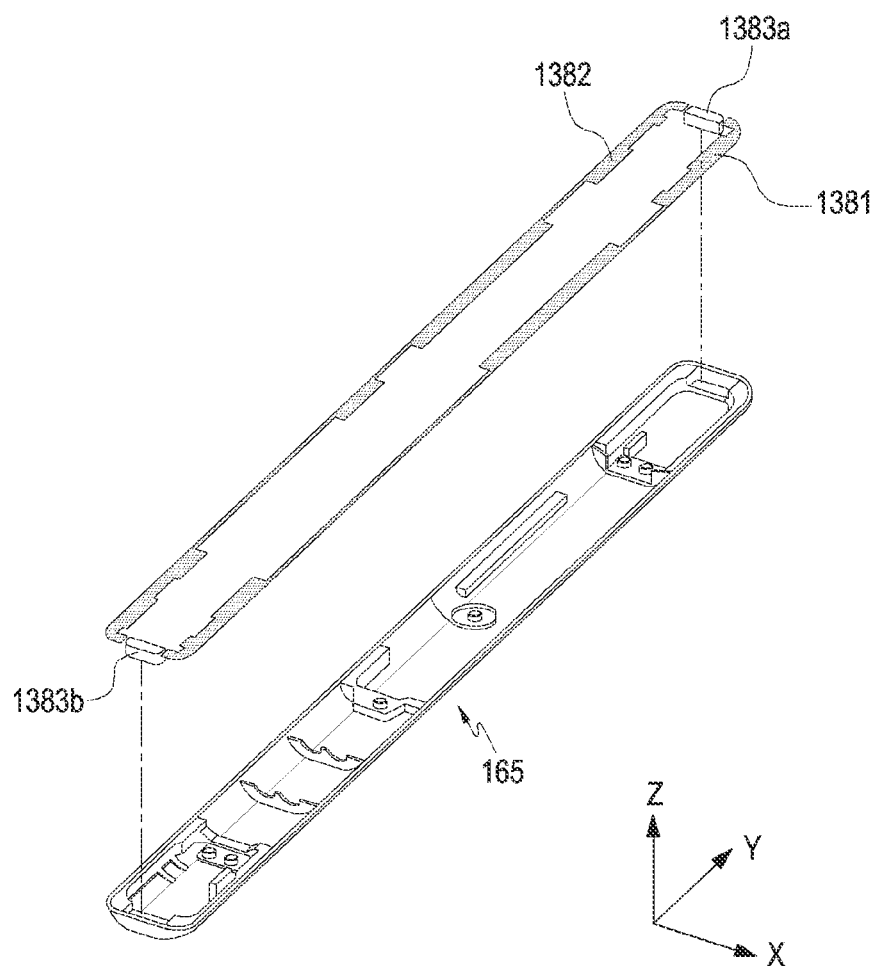
FIG. 27 is a perspective view illustrating a modified sealing member in a portable communication device or electronic device according to an embodiment of the disclosure.

FIG. 27 is a perspective view illustrating a modified sealing member in a portable communication device or electronic device according to an embodiment of the disclosure.

Referring to FIG. 27, a first sealing member 1381 or a second sealing member 1382 may be extended or disposed along the lengthwise direction Y and be mounted on the hinge cover 165. As set forth above, according to an embodiment, the first sealing member 1381 or the second sealing member 1382 may be integrally formed with the hinge cover 165. Although FIG. 27 illustrates that the first sealing member 1381 and the second sealing member 1382 are separate components arranged symmetrically with each other, the disclosure is not limited thereto. For example, the first sealing member 1381 and the second sealing member 1382 may be integrally formed with each other and may be attached along the edge of the hinge cover 165. According to an embodiment, the first sealing member 1381 and the second sealing member 1382 may be shaped to form a closed curve and may be attached along the edge of the hinge cover 165.

According to an embodiment, third sealing members 1383*a* and 1383*b* may be attached onto the inner surface of the hinge cover 165, at two opposite ends of the lengthwise direction Y. According to an embodiment, the third sealing members 1383*a* and 1383*b* may be disposed to form closed curve trajectories with the first sealing member 1381 and the second sealing member 1382. According to an embodiment, when the first sealing member 1381 and the second sealing member 1382 are integrally formed together or are shaped to form a closed curve, the third sealing members 1383*a* and 1383*b* may at least partially be disposed in the area surrounded by the first sealing member 1381 and the second sealing member 1382.

According to an embodiment, in implementing the real-world product, the above-described embodiments may be combined together or replaced. For example, the sealing members 181 and 182 disposed in the housing structures 110 and 120 of FIG. 4 may be replaced with the sealing members 1081 and 1082 of FIG. 20 or the dummy members 1181 and 1182 of FIG. 24. According to an embodiment, the electronic device (e.g., the electronic device 100 of FIGS. 1 to 3) may include the sealing members 181 and 182 disposed in the housing structures 110 and 120 and the sealing members 1081 and 1082 or dummy members 1181 and 1182 disposed on the hinge cover 165. Some selected from among the sealing members 181, 182, 1081, 1082, 1181, and 1182 may be combined with some selected from among the third sealing members 481*a*, 481*b*, 1383*a*, and 1383*b* of FIG. 9 or 27, forming a sealing structure between the hinge cover and the housing structure 110 or 120 or between the hinge cover and the display.

As set forth above, according to an embodiment, a portable communication device or electronic device (e.g., the electronic device 100, 200, or 300 of FIGS. 1 to 8) comprises a housing including a first housing structure (e.g., the first housing structure 110 of FIGS. 1 to 3), a second housing structure (e.g., the second housing structure 120 of FIGS. 1 to 3), and a hinge cover (e.g., the hinge cover 165 of FIGS. 1 to 3) positioned between at least a portion of the first housing structure and at least a portion of the second housing structure, a flexible display at least partially received in the housing and including a first portion (e.g., the first portion 131*a* of FIG. 2 or 10) corresponding to the first housing structure, a second portion (e.g., the second portion 131*b* of FIG. 2 or 10) corresponding to the second housing structure, and a third portion (e.g., the folding portion 131*c* of FIG. 2 or 10) corresponding to the hinge cover, a hinge structure (e.g., the hinge structure 164*a* of FIG. 3) positioned between the third portion of the flexible display and the hinge cover and connected with the first housing structure and the second housing structure, and at least one sealing member (e.g., the third sealing member 481*a* and 481*b* of FIG. 9, 11, or 12) positioned between the third portion of the flexible display and the hinge cover and contacting the hinge cover.

According to an embodiment, the portable communication device or electronic device may further comprise a first sealing member (e.g., the first sealing member 181, 281, or 381 of FIGS. 3 to 8) positioned between the first housing structure and the hinge cover.

According to an embodiment, the first sealing member may be positioned to contact the first housing structure.

According to an embodiment, the first sealing member may be positioned to contact the hinge cover.

According to an embodiment, the portable communication device or electronic device may further comprise a second sealing member (e.g., the first sealing member 182, 282, or 382 of FIGS. 3 to 8) positioned between the second housing structure and the hinge cover.

According to an embodiment, the second sealing member may be positioned to contact the second housing structure.

According to an embodiment, the sealing member may be positioned to contact the third portion when the third portion of the flexible display is at least partially folded.

According to an embodiment, the sealing member may be deformed corresponding to the shape of the third portion when the third portion of the flexible display is at least partially folded.

According to an embodiment, the sealing member may include a sponge.

According to an embodiment, a bottom and side surface of the sealing member may contact the hinge cover.

According to an embodiment, a portable communication device or electronic device comprises a first housing structure, a second housing structure rotating between a first position folded to face the first housing structure and a second position unfolded in parallel with a side of the first housing structure, a hinge structure rotatably coupling the first housing structure and the second housing structure, a hinge cover disposed between the first housing structure and the second housing structure to cover the hinge structure, a display including a first portion disposed in the first housing structure, a second portion disposed in the second housing structure, and a folding portion provided between the first portion and the second portion and disposed corresponding to the hinge cover, and at least one sealing member mounted on the hinge cover to block influx of foreign bodies between the hinge cover and the display, wherein the sealing member tightly contacts an edge of the display.

According to an embodiment, the portable communication device or electronic device may include a pair of sealing members each of which is disposed at a respective one of two opposite ends of the hinge cover.

According to an embodiment, the portable communication device or electronic device may further comprise a first sealing member positioned between the first housing structure and the hinge cover.

According to an embodiment, the first sealing member may be positioned to contact the first housing structure.

According to an embodiment, the portable communication device or electronic device may further comprise a second sealing member positioned between the second housing structure and the hinge cover.

According to an embodiment, the first sealing member may be disposed in the first housing structure, and the second sealing member may be disposed in the second housing structure. As the first housing structure and the second housing structure rotate, the first sealing member and the second sealing member may slidingly contact an outer circumferential surface of the hinge cover.

According to an embodiment, the first sealing member or the second sealing member includes a body (e.g., the body 281*a* and 282*a* of FIG. 7) formed of sponge and a sheath layer (e.g., the sheath layer 281*b* and 282*b* of FIG. 7) formed of a fabric material and provided to surround the body.

According to an embodiment, the at least one sealing member may be positioned to contact the folding portion when the folding portion is at least partially folded.

According to an embodiment, at least one sealing member may be deformed corresponding to the shape of the folding portion when the folding portion is at least partially folded.

According to an embodiment, the display may include a first attaching area (e.g., the first attaching area 491*a* of FIG. 10) provided along an edge of the first portion and attached to the first housing structure, a second attaching area (e.g., the second attaching area 491*b* of FIG. 10) provided along an edge of the second portion and attached to the second housing structure, and a plurality of contacting areas (e.g., the contacting areas 493*a* and 493*b* of FIG. 10) provided at two opposite ends of the folding portion and contacting the at least one sealing member, and the first attaching area, the second attaching area, and the plurality of contacting areas may be combined to form a closed curve.

According to an embodiment, the first sealing member and the second sealing member each comprises an elastic material, the elastic material including at least one of rubber, silicone, sponge, polycarbonate, or Teflon™.

According to an embodiment, the first sealing member and the second sealing member each comprises a low friction-factor material to reduce noise or wear upon contact, and the low friction-factor material includes at least one of a fabric or a lubricative high-polymer.

According to an embodiment, the at least one sealing member extends in a lengthwise direction of the portable communication device.

As is apparent from the foregoing description, according to various embodiments of the disclosure, the sealing member is provided between the outer structures, such as the first housing structure, second housing structure, and hinge structure, preventing influx of foreign bodies into the inside of the electronic device. For example, it is possible to prevent damage to mechanical or electronical components inside the electronic device. According to an embodiment, as large a gap as the sealing member may be secured between the outer structures, preventing direct friction between the rigid structures that may be caused when they open or close with respect to each other. According to an embodiment, as the portable communication device or electronic device opens or closes, a portion of the display may transform from flat to curved (or vice versa), and the sealing member is disposed where the display deforms, thus sealing off the path along which foreign bodies comes in. According to an embodiment, the sealing member corresponding to where the display deforms is formed of a low-density elastic member, e.g., sponge, thus minimizing a load to the display while blocking off the influx path of foreign bodies.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A portable communication device, comprising:
a housing including:
a first housing structure,
a second housing structure rotatable with respect to the first housing structure, and
a hinge cover positioned between at least a portion of the first housing structure and at least a portion of the second housing structure;
a flexible display at least partially received in the housing, the flexible display including:
a first display portion corresponding to the first housing structure, and
a second display portion corresponding to the second housing structure; and
a hinge structure connected with the first housing structure and the second housing structure,
wherein the first housing structure includes:
a first housing portion defining a first inner surface configured to surround a first portion of the hinge cover while the housing is unfolded, the first housing portion including a first protrusion at an end of the first housing portion extending substantially perpendicularly from the first housing portion towards the hinge cover,
wherein the second housing structure includes:
a second housing portion defining a second inner surface configured to surround a second portion of the hinge cover while the housing is unfolded, the second housing portion including a second protrusion at an end of the second housing portion extending substantially perpendicularly from the second housing portion towards the hinge cover,
wherein the first inner surface and the second inner surface are configured to surround the hinge cover while the housing is unfolded,
wherein the first housing portion is configured to form a first gap between an end of the first protrusion and an outer surface of the hinge cover while the housing is folded,
wherein the second housing portion is configured to form a second gap between an end of the second protrusion and the outer surface of the hinge cover while the housing is folded,
wherein the first protrusion is substantially perpendicular to the first display portion while the housing is unfolded, and
wherein the second protrusion is substantially perpendicular to the second display portion while the housing is unfolded.

2. The portable communication device of claim 1, wherein the hinge cover includes at least one third protrusion configured to be positioned adjacent to the first protrusion to form the first gap in a folded state in which the second housing structure is folded to face the first housing structure.

3. The portable communication device of claim 1, wherein the first protrusion includes at least one of a painted layer, a coated layer, or synthetic resin formed on a surface of the first housing structure.

4. The portable communication device of claim 1, wherein the first gap is smaller than a gap between the outer surface of the hinge cover and the first housing portion.

5. The portable communication device of claim 1, further comprising:
a first sealing member disposed on the first inner surface of the first housing structure, and positioned adjacent to the first protrusion,
wherein the first sealing member is configured to be in contact with the outer surface of the hinge cover.

6. The portable communication device of claim 5, wherein the first sealing member includes fabric, a lubricative high-polymer material, or a sponge.

7. The portable communication device of claim 1, further comprising:
a second sealing member disposed on the second inner surface of the second housing structure, and positioned adjacent to the second protrusion,
wherein the second sealing member is configured to be in contact with the outer surface of the hinge cover.

8. The portable communication device of claim 7, wherein the second sealing member includes fabric, a lubricative high-polymer material, or a sponge.

9. The portable communication device of claim 7, wherein the second protrusion is configured to move along the outer surface of the hinge cover during folding operation or unfolding operation of the housing.

10. The portable communication device of claim 1, wherein the second gap is smaller than a gap between the outer surface of the hinge cover and the second housing portion.

11. The portable communication device of claim 1, wherein the first protrusion is configured to move along the outer surface of the hinge cover during folding operation or unfolding operation of the housing.

* * * * *